United States Patent
Sharma et al.

(10) Patent No.: US 12,471,124 B2
(45) Date of Patent: Nov. 11, 2025

(54) METHOD AND SYSTEM FOR RESOURCE SELECTION AND CONTENTION RESOLUTION IN SHARED RESOURCE MECHANISM

(71) Applicant: SAMSUNG ELECTRONICS CO., LTD., Suwon-si (KR)

(72) Inventors: Neha Sharma, Bangalore (IN); Vikalp Mandawaria, Bangalore (IN); Seungil Park, Suwon-si (KR); Chitradeep Majumdar, Bangalore (IN); Anshuman Nigam, Bangalore (IN); Jungsoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 709 days.

(21) Appl. No.: 17/853,245

(22) Filed: Jun. 29, 2022

(65) Prior Publication Data
US 2023/0008530 A1   Jan. 12, 2023

(30) Foreign Application Priority Data

Jun. 30, 2021 (IN) .............................. 202141029509
Jun. 24, 2022 (IN) .............................. 202141029509

(51) Int. Cl.
*H04W 72/54* (2023.01)
*H04L 1/00* (2006.01)
(Continued)

(52) U.S. Cl.
CPC ........... *H04W 72/54* (2023.01); *H04L 1/0003* (2013.01); *H04W 72/52* (2023.01); *H04W 72/535* (2023.01)

(58) Field of Classification Search
CPC ... H04W 72/54; H04W 72/535; H04W 72/52; H04L 1/0003
See application file for complete search history.

(56) References Cited

U.S. PATENT DOCUMENTS

2013/0114533 A1* 5/2013 Ji ........................... H04L 5/0044
                                                          370/329
2015/0181590 A1* 6/2015 Park ...................... H04L 5/0055
                                                          370/280
(Continued)

FOREIGN PATENT DOCUMENTS

EP      3506708          7/2019
KR   10-2011-0073217     6/2011

OTHER PUBLICATIONS

Indian Examination report issued Feb. 7, 2023 in corresponding Indian Patent Application No. 202141029509.

*Primary Examiner* — Ajay Cattungal
(74) *Attorney, Agent, or Firm* — NIXON & VANDERHYE P.C.

(57) ABSTRACT

Embodiments of the disclosure provide a method for scheduling shared physical resource blocks (PRBs) by a user equipment (UE) in a wireless network and minimizing/reducing contention on the shared PRBs. The method includes: receiving PRBs from a network device, where the PRBs are shared among multiple UEs in the wireless network; detecting data at the UE for transmission; determining a modulation and coding scheme (MCS), a number of PRBs, and a size of a transport block required for data transmission in response to detecting the data; self-scheduling the shared PRBs based on at least one of the determined MCS, the number of PRBs, and the size of the transport block; and sending the data based on the self-scheduling along with self-scheduling information to the network device.

20 Claims, 11 Drawing Sheets

(51) Int. Cl.
*H04W 72/50* (2023.01)
*H04W 72/52* (2023.01)

(56) References Cited

U.S. PATENT DOCUMENTS

| | | | |
|---|---|---|---|
| 2017/0230970 A1* | 8/2017 | Kim | H04W 16/14 |
| 2018/0077748 A1* | 3/2018 | Kazmi | H04W 76/14 |
| 2018/0145794 A1* | 5/2018 | Zhang | H04L 1/1861 |
| 2019/0181976 A1* | 6/2019 | Golitschek Edler von Elbwart | H04W 72/0446 |
| 2020/0186286 A1* | 6/2020 | Andersson | H04W 72/23 |
| 2021/0227512 A1* | 7/2021 | Solano Arenas | H04L 5/0082 |
| 2023/0008530 A1* | 1/2023 | Sharma | H04L 1/0009 |
| 2024/0305419 A1* | 9/2024 | Su | H04L 1/0061 |

* cited by examiner

METHOD AND SYSTEM FOR RESOURCE SELECTION AND CONTENTION RESOLUTION IN SHARED RESOURCE MECHANISM

CROSS REFERENCE TO RELATED APPLICATIONS

This application is based on and claims priority under 35 U.S.C. § 119 to Indian Provisional Patent Application Serial No. 202141029509 (PS), filed on Jun. 30, 2021, in the Indian Patent Office, and to Indian Complete Patent Application Serial No. 202141029509 (CS), filed on Jun. 24, 2022, in the Indian Patent Office, the disclosure of which are incorporated by reference herein in their entireties.

BACKGROUND

Field

The disclosure relates to wireless communication and for example to a method and an apparatus for resource selection and contention resolution in a shared resource mechanism.

Description of Related Art

In general, several broadband wireless technologies have been developed in recent years to provide enhanced applications and services to meet rising needs of broadband users. A Second Generation (2G) wireless communication system has been created to deliver voice services while ensuring mobility of the users. A Third-Generation (3G) wireless communication system provides both voice and data services to the users. A Fourth-Generation (4G) wireless communication system has been developed in recent years to provide high-speed data delivery. However, the fourth-generation wireless communication system still lacks resources needed to fulfill the rising needs for high-speed data services. This problem is addressed by a deployment of a Fifth-Generation (5G) wireless communication system to meet the rising needs for high-speed data services. Furthermore, the fifth-generation wireless communication system provides ultra-reliability and supports low latency applications.

For the next generation of the wireless communication system (e.g. 6G), various technologies have been considered, such as Visible Light Communication (VLC), Terahertz (THz) band e.g., frequencies from 100 GHz to 3 THz, Infrared wave, and Ultraviolet wave. Among all these technologies, the THz band is envisioned as a potential technology for a broad variety of applications at Nano/Micro/Macro sizes. The THz band has several advantages, including an ability to offer Terabits per second (Tbps) data speeds, reliable transmission, and low latency. Because of a large variety of unused and undiscovered spectrum, frequencies ranging from 100 GHz to 3 THz are potential bands for the next generation of wireless communication systems. The THz band has the potential for revolutionary applications in the devices, circuits, signal processing, and systems. Further, the THz band/mm Wave's cellular networks provide ultra-high data rates for super-fast download speeds for computer communication, autonomous vehicles, robotic controls, information shower, high-definition holographic gaming, entertainment, video conferencing, and high-speed wireless data distribution in data centers.

Another important use case area in the 6G wireless communication system is to promote ubiquitous and high-capacity global connectivity. A Non-Terrestrial Network (NTN) is a key research area that can provide high-capacity connectivity in future wireless communication systems/the 6G wireless communication system as shown in FIG. 1A. The NTN is expected to encourage the deployment of 6G/Beyond fifth-generation (B5G) wireless communication systems in underserved areas (e.g., suburban/rural areas) and unserved areas (e.g., isolated/remote areas, on board aircraft or vessels) to improve the performance of limited terrestrial networks cost-effectively, coverage, user bandwidth, system capacity, service reliability or availability, energy consumption, and connection density. The NTN includes both a spaceborne and an airborne network. The spaceborne network includes a Geostationary Equatorial Orbit (GEO), a Low Earth Orbit (LEO), and a Medium Earth Orbit (MEO) satellites while access network is based on an Unmanned Aerial System (UAS) including a High Altitude Platform Station (HAPS) could be considered as a special case of non-terrestrial access with lower delay/Doppler value and variation rate. The NTN network which is based on the satellites and the UAS or the HAPS can be used to improve the coverage as well as to improve the capacity of the system.

The NTN uses a conventional scheduling mechanism that is inefficient due to large propagation delays (12 ms to 541 ms), which is one of the NTN's drawbacks. The large propagation delays can exacerbate a scheduling delay, negatively impacting a user experience. As a result, contention-based data transmission (CBDT) is used, in which a network reserves a limited number of physical resources or grants for data transmission and distributes them to all UEs, thereby reducing large propagation delays to some extent. In the conventional scheduling mechanism, the UEs are assigned dedicated Resource Blocks (RBs) (Physical Resource Blocks (PRBs)) and provide an appropriate Modulation and Coding Scheme (MCS) for uplink data transmission. Where the MCS specifies a maximum number of data and/or control bits that can be carried by a single symbol. While in the CBDT, the network can only provide a shared set of PRBs to the UE which is shared among the multiple UEs (e.g., shared resource mechanism), the network does not provide the appropriate MCS for the uplink data transmission. As a result, once the UE has data to send for the uplink data transmission, the appropriate MCS and number of PRBs must be determined. A new mechanism for determining the appropriate MCS and the number of PRBs for each UE is required.

Furthermore, there is no contention in the conventional scheduling mechanism because the UE always has dedicated resources. In the CBDT, when multiple UEs use the same set of PRBs, there is a high probability of network contention. The UE can select any PRB from a pre-configured list. Data PRBs and control PRBs are two types of resources available. The control PRB provides information such as an MCS index and the number of PRBs, whereas the data PRB contains actual data. The network can first check the control PRBs to see if there is any contention, and if there is, the packet is typically discarded. The problem is that the network will discard the data of all UEs that have access to the shared resources. The network should ideally allow at least one UE with shared resources to connect. As a result, a new mechanism must be defined to ensure that there is less contention at the network and provides contention resolution at the network.

Thus, it is desired to address the above-mentioned disadvantages or other shortcomings or at least provide a useful alternative for resource selection and contention resolution in the shared resource mechanism.

SUMMARY

Embodiments of the disclosure provide a method for scheduling shared Physical Resource Blocks (PRBs) in a wireless network during Contention Based Data Transmission (CBDT). A User Equipment (UE) receives PRB from a network device, where the PRB is shared among multiple UEs in the wireless network. The UE determines a Modulation and Coding Scheme (MCS), number of PRBs, and the size of a transport block based on with and without network assistance for a shared resource mechanism (e.g., CBDT) upon detecting data for transmission (e.g., uplink transmission). The UE self-schedules the shared PRB based on the determined MCS, the number of PRBs, and the size of the transport block. As a result, the method improves user experience by reducing scheduling delays during Non-Terrestrial Network (NTN) transmission/CBDT (e.g., Internet of Things (IoT) traffic, Voice over Internet Protocol (VoIP) traffic).

Embodiments of the disclosure send self-scheduling information to the network device. The self-scheduling information indicates the used PRB of the shared PRB for the data transmission and the used MCS for the data transmission.

Embodiments of the disclosure determine the MCS, and the number of PRBs, by the network device, is required for the CBDT based on a plurality of measurement parameters and a plurality of network parameters. The plurality of measurement parameters includes an uplink channel state information (CSI), an uplink Sounding Reference Signal (SRS), and an uplink Channel Quality Indicator (CQI) information. The plurality of network parameters includes a type of traffic, a ratio of an Acknowledgement (ACK) and a Negative Acknowledgement (NACK), and a radio condition. The network device sends an indication of the determined MCS and the number of PRBs to the UE based on a requirement of the UE and an availability of the number of PRBs at the network device.

Embodiments of the disclosure provide the method for minimizing/reducing contention on the shared PRB based on a plurality of contention minimization/reduction parameters and/or an access control parameter and/or a random selection and/or coordination information. The plurality of contention minimization/reduction parameters includes a high Signal-to-Interference-plus-Noise Ratio (SINR) and Block error rate (BLER), a type of data application, and a size of a transport block. The access control parameter includes a Contention Based Data Transmission (CBDT) barring factor and a CBDT barring timer. As a result, the method improves the user experience by minimizing/reducing contention during the NTN transmission/CBDT.

According to an embodiment, a method for scheduling shared Physical Resource Blocks (PRBs) in a wireless network is provided. The method includes: receiving, by a User Equipment (UE), PRBs from a network device, where the PRBs are shared among multiple UEs in the wireless network; detecting, by the UE, data at the UE for transmission; determining, by the UE, a Modulation and Coding Scheme (MCS), number of PRBs, and size of a transport block required for the CBDT in response to detecting the data; self-scheduling, by the UE, the shared PRBs based on at least one of the determined MCS, the number of PRBs, and the size of the transport block; and sending, by the UE, the data to the network device based on the self-scheduling.

In an embodiment, determining, by the UE, the MCS includes determining, by the UE, a signal condition at the UE; determining, by the UE, size of the data for transmission; and determining, by the UE, the MCS based on the signal condition and the size of data.

In an embodiment, determining, by the UE, the signal condition at the UE includes determining, by the UE, whether the wireless network utilizes a Frequency Division Duplex (FDD) or Time Division Duplex (TDD); performing, by the UE, one of, determining an uplink channel state information (CSI) and/or an uplink Channel Quality Indicator (CQI) information in response to determining that the wireless network utilizes the FDD, where the uplink CSI and/or the uplink CQI information receives from the network device based on a requirement of the UE; or determining a downlink CSI and/or a downlink CQI information in response to determining that the wireless network utilizes the TDD to determine the uplink CSI and/or the CQI; and determining, by the UE, the signal condition at the UE based on the uplink CSI and/or the uplink CQI information, and/or the downlink CSI and/or the downlink CQI information.

In an embodiment, the uplink CSI and downlink CSI includes, one or more, the CQI, a Precoding Matrix Indicator (PMI), a Rank Indicator (RI), a Level-1 Reference Signal Received Power (L1-RSRP), and a Level-1 Signal to Interference and Noise Ratio (L1-SINR).

In an embodiment, determining, by the UE, the size of the transport block includes determining, by the UE, a buffer status available at a Medium Access Control (MAC) layer, a Radio link control (RLC) layer, and a Packet Data Convergence Protocol (PDCP) layer; and determining, by the UE, the size of the transport block base on the available buffer status.

In an embodiment, determining, by the UE, the number of PRBs includes determining, by the UE, the number of PRBs based on one of the size of the transport block and a network indication in a Radio Resource Control (RRC) message or Downlink Control Information (DCI) message.

In an embodiment, the method includes: sending, by the UE, self-scheduling information to the network device, where the self-scheduling information indicates the used PRB of the shared PRBs for the data transmission and/or the used MCS for the data transmission.

According to an embodiment, a method for scheduling the shared PRBs in the wireless network is provided. The method includes: determining, by the network device, a signal condition at the network device based on a plurality of measurement parameters; determining, by the network device, the MCS, and the number of PRBs required for the data transmission of a UE based on a plurality of network parameters; and sending, by the network device, an indication of the determined MCS and the number of PRBs to the UE(s) based on a requirement of the UE(s) and availability of the number of PRBs.

In an embodiment, the plurality of measurement parameters includes, one or more, the uplink CSI, an uplink Sounding Reference Signals (SRS), and the uplink CQI information.

In an embodiment, the plurality of network parameters includes, one or more, a type of traffic, a ratio of an Acknowledgement (ACK) and a Negative Acknowledgement (NACK), and a radio condition.

In an embodiment, the method includes pre-configuring, by the network device, a fixed MCS for the CBDT for the UE(s) and a group of UEs; or pre-configuring, by the network device, a common MCS for the CBDT for the UE(s) and the group of UEs.

In an embodiment, the UE(s) receives the indication from the network device periodically, a-periodically, or semi-persistently.

According to an example embodiment, a method for reducing contention on the shared PRBs in the wireless network is provided. The method includes: determining, by the network device, that the multiple UEs uses the same PRB of the shared PRBs for sending the data to the network device; reducing, by the network device, the contention on the shared PRBs based on a plurality of contention minimization parameters.

In an embodiment, the plurality of contention minimization parameters includes, one or more, a high Signal-to-Interference-plus-Noise Ratio (SINR) and Block Error Rate (BLER), a type of data application, and a size of the transport block.

According to an embodiment a method for minimizing/reducing the contention on the shared PRBs in the wireless network is provided. The method includes: receiving, by the UE, PRBs along with an access control parameter from the network device, where the PRBs are shared among multiple UEs in the wireless network; detecting, by the UE, the data at the UE for the transmission; self-scheduling, by the UE, the shared PRBs based on the access control parameter to minimize/reduce the contention on the shared PRBs; and sending, by the UE, the data to the network device based on the self-scheduling.

In an embodiment, the access control parameter comprises a Contention Based Data Transmission (CBDT) barring factor and a CBDT barring timer.

In an embodiment, the CBDT barring factor restricts access to the shared PRBs, and the CBDT barring timer prevents the UE from using the shared PRBs until the CBDT barring timer expires.

According to an embodiment, a method for minimizing/reducing the contention on the shared PRBs in the wireless network is provided. The method includes: receiving, by the UE, the PRBs along from the network device, where the PRBs are shared among the multiple UEs in the wireless network; detecting, by the UE, the data at the UE for the transmission; self-scheduling, by the UE, the shared PRBs based on a random selection and/or coordination information to minimize/reduce the contention on the shared; and sending, by the UE, the data to the network device based on the self-scheduling.

According to an embodiment, the UE for scheduling the shared PRBs in the wireless network during the CBDT is provided. The UE includes: a memory and at least one processor coupled to the memory. The at least one processor is configured to: receive the PRBs from the network device, where the PRBs are shared among the multiple UEs in the wireless network; detect the data at the UE for transmission; determine the MCS, the number of PRBs, and the size of the transport block required for the CBDT in response to detecting the data self-schedule the shared PRBs based on the determined MCS, the number of PRBs, and the size of the transport block; and send the data to the network device based on the self-scheduling.

According to an embodiment the network device for scheduling the shared PRBs in the wireless network during the CBDT is provided. The network device includes: a memory and at least one processor coupled to the memory. The at least one processor is configured to: determine the signal condition at the network device based on the plurality of measurement parameters; determine the MCS, and the number of PRBs required for the CBDT based on the plurality of network parameters; and send the indication of the determined MCS and the number of PRBs to the UE(s) based on the requirement of the UE(s) and the availability of the number of PRBs.

According to an embodiment, the network device for minimizing/reducing the contention on the shared PRBs in the wireless network is provided. The network device includes: a memory and at least one processor coupled to the memory. The at least one processor is configured to: determine that the multiple UEs uses the same PRB of the shared PRBs for sending the data to the network device; and minimize/reduce the contention on the shared PRBs based on the plurality of contention minimization parameters.

According to an embodiment, the UE for minimizing/reducing contention on the shared PRBs in the wireless network is provided. The UE includes: a memory and at least one processor coupled to the memory. The at least one processor is configured to: receive the PRBs along with the access control parameter from the network device, where the PRBs are shared among the multiple UEs in the wireless network; detect the data at the UE for the transmission; self-schedule the shared PRBs based on the access control parameter to minimize/reduce the contention on the shared PRBs; and send the data to the network device based on the self-scheduling.

According to an embodiment, the UE for minimizing/reducing the contention on the shared PRBs in the wireless network is provided. The UE includes a memory and at least one processor coupled to the memory. The at least one processor is configured to: receive the PRBs along with the access control parameter from the network device, where the PRBs are shared among the multiple UEs in the wireless network; detect the data at the UE for the transmission; self-schedule the shared PRBs based on the random selection and/or the coordination information to minimize/reduce the contention on the shared PRBs; and send the data to the network device based on the self-scheduling.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Figure 1A:
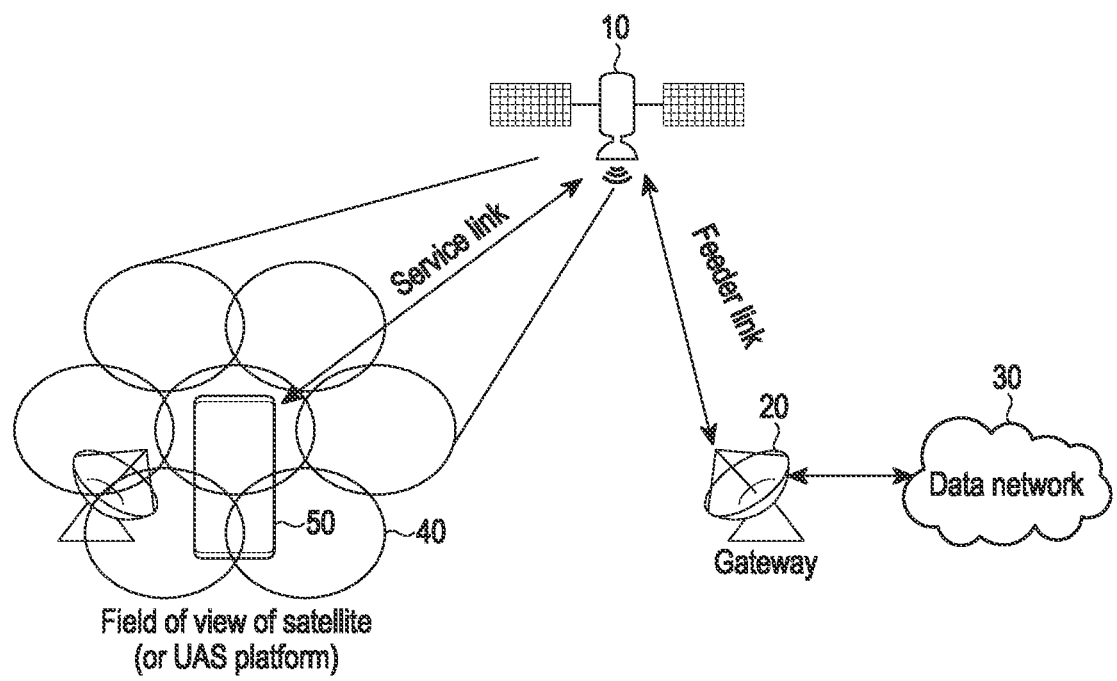
FIG. 1A is a diagram illustrating a basic scenario of a Non-Terrestrial Network (NTN) for providing Physical Resource Blocks (PRBs) to a User Equipment (UE), according to prior art.

FIG. 1A is a diagram illustrating a basic scenario of a Non-Terrestrial Network (NTN) for providing Physical Resource Blocks (PRBs) to a User Equipment (UE) (50), according to prior art. The NTN includes a satellite (10), a gateway (20), a data network (30), and the UE (50).

As per 3rd Generation Partnership Project (3GPP) Technical Report (TR) 38.821, the NTN typically features one or several sat-gateways (e.g., gateway (20)) that connect the NTN to a public data network (e.g., data network (30)). A GEO satellite (e.g., satellite (10)) is fed by one or several sat-gateways which is deployed across the satellite targeted coverage (40) (e.g. regional or even continental coverage). Assume that the UE (50) in a cell is served by only one sat-gateway. A non-GEO satellite (e.g., satellite (10)) is served successively by one or several sat-gateways (e.g., gateway (20)) at a time. The system ensures service and feeder link continuity between the successive serving sat-gateways with sufficient time duration to proceed with mobility anchoring and hand-over. A feeder link or a radio link is present between the sat-gateway (e.g., gateway (20)) and the satellite (10) (or UAS platform). A service link or the radio link is present between the UE (50) and the satellite (10) (or UAS platform). The satellite (10) (or UAS platform) may implement either a transparent or a regenerative (with on-board processing) payload. The satellite (10) (or UAS platform) generates beams, typically generate several beams over a given service area bounded by its field of view. The footprints of the beams are typically of elliptic shape. The field of view of the satellite (or UAS platforms) (40) depends on an on-board antenna and min elevation angle. A transparent payload has radio frequency filtering, frequency conversion, and amplification. Hence, a waveform signal repeated by the payload is un-changed.

A regenerative payload has radio frequency filtering, frequency conversion, and amplification as well as demodulation/decoding, switch and/or routing, and coding/modulation. This is effectively equivalent to having all or part of base station functions (e.g., gNodeB (gNB)) on board the satellite (or UAS platform). Inter-Satellite links (ISL) optionally in case of a constellation of satellites. This will require regenerative payloads on board the satellites. The ISL may operate in Radio Frequency (RF) or optical bands. The UE (50) is served by the satellite (10) (or UAS platform) within the targeted service area. There may be different types of satellites (or UAS platforms) listed in Table (1).

Propagation delays or max round trip delay is amount of time a signal takes to travel from a sender to a receiver. In terrestrial mobile systems, the propagation delays are usually less than 1 millisecond (ms). The propagation delays in the NTN are much longer, ranging from several milliseconds to hundreds of milliseconds depending on altitudes of the spaceborne or the airborne platforms and payload type in the NTN. As an example, the propagation delay ranges for a transparent payload: service and feeder links are 25.77 ms (600 km) and 41.77 ms (1200 km) for the LEO satellites, For the GEO satellites it is 541.46 ms (service and feeder links)

and 270.73 ms (service link only). Dealing with such long propagation delays requires modifications of many timing aspects in NR from the physical layer to higher layers, including a Timing Advance (TA) mechanism, measurement information, Channel Quality Indicator (CQI), Hybrid Automatic Repeat Request (HARQ) procedure, scheduling information, etc.

TABLE 1

Types of NTN platforms

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station-keeping position | 200-3500 km |
| UAS platform (including HAPS) | 8-50 km (20 km for HAPS) | fixed in terms of elevation/azimuth with respect to a given earth point | 5-200 km |
| High Elliptical Orbit (HEO) satellite | 400-50000 km | Elliptical around the earth | 200-3500 km |

The scheduling procedure in the NTN non-terrestrial networks has the disadvantage of taking at least two round-trip times from data arriving in a buffer at the UE (50) side until the data can be properly scheduled with resources that fit the data and required Quality of Service (QoS). This may become prohibitively expensive due to the long propagation delays. The long propagation delay can exacerbate the scheduling delay, negatively impacting the user experience. As a result, a new mechanism is required to ensure that there is no long propagation delay.

Figure 1B:
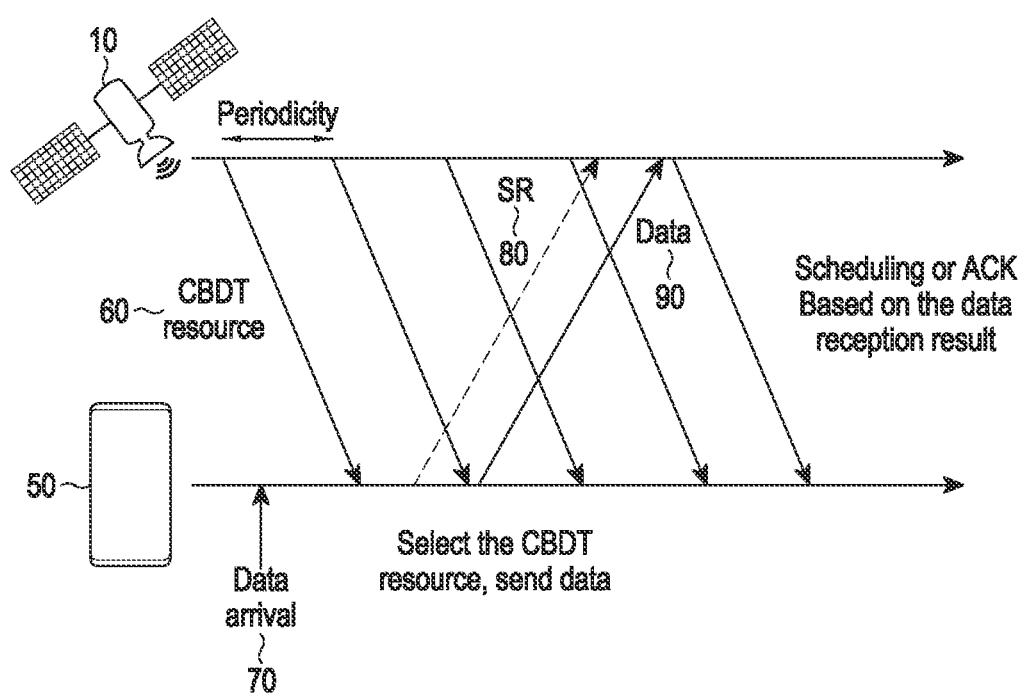
FIG. 1B is a diagram illustrating a problem in contention-based grants provided in the NTN, according to prior art.

A Contention-Based Data Transmission (CBDT) or shared resource mechanism is a scheme used for less propagation delay in which a network can reserve a few Physical Resource Blocks (PRBs) or grants for data transmission and share them with all UEs (50). These resources are available for use by any of the UE (50) as needed. Contention can occur at the network if multiple UEs (50) attempt to use the same set of resources. FIG. 1B depicts an example of such scheduling.

FIG. 1B is a diagram illustrating a problem in contention-based grants provided in the NTN, according to prior art.

When the UE (50) detects the data for transmission (70), the UE (50) first checks whether any CBDT-related resources are available; if so, the UE (50) selects the CBDT-related resources and sends the data (90), as well as a Scheduling Resource (SR) (80), to a network device (e.g. satellite (10)). If there is contention, the network device (10) can grant permission to send a Buffer Status Report (BSR). When the network device receives the BSR, the network device (10) will determine whether or not there is any contention because multiple UEs (50) may use the same set of resources (e.g., CBDT related resources). If there is no contention, the network device (10) sends an Acknowledgement (ACK) to the UE (50). When multiple UE (50) attempt to use the same resources (CBDT-related resources), the network device (10) sends grants to the UE (50) so that the UE (50) can send the BSR. If a contention occurs, the network device (10) should shift back to the prior art, e.g., normal scheduling procedure (e.g., conventional scheduling mechanism), in which the UE (50) first sends the BSR and, once the network device (10) receives the BSR, then the network device (10) grants the UE (50) to send the data (90).

In the conventional scheduling mechanism, the UEs (50) are allocated with dedicated Resource Blocks (RBs), the UEs (50) are also provided with an appropriate Modulation and Coding Scheme (MCS) for the uplink data transmission. The MCS defines numbers of data and/or control bits or the maximum number of bits that can be carried by one symbol. A value of the MCS is decided by the network device (10) which further depends on the signal condition, load, and amount of data at the UE (50). The MCS is allocated by the gNB using a link adaptation mechanism. The allocated MCS is signalled to the UE (50) using a Downlink Control Information (DCI) over a Physical Downlink Control Channel (PDCCH) channel e.g. DCI 1_0, DCI 1_1 DCI Format 0_1. DCI format 0_1 is used for uplink resource allocation (scheduling grants) for a Physical Uplink Shared Channel (PUSCH). Based on the indication of the network device (10) for the MCS and other parameters like resource blocks, etc. the UE (50) selects a transport block size for data transmission.

The network device (10) can only provide a set of PRBs to the UE (50) in the shared resource mechanism, which is shared among the multiple UEs in this scheduling scheme. Once the UE (50) has the data (70), the MCS and number of PRBs must be determined. As a result, there is a need to implement a mechanism and procedure for MCS selection as well as the number of PRBs procedure at the UE (50) to select the appropriate transport block size.

The contention is another issue in the shared resource mechanism that can arise at the network device (10) when multiple UEs attempts to use the same set of PRBs. As a result, mechanisms to reduce or avoid this contention are required in order for the CBDT resource mechanism to benefit the largest number of UE.

Figure 2:
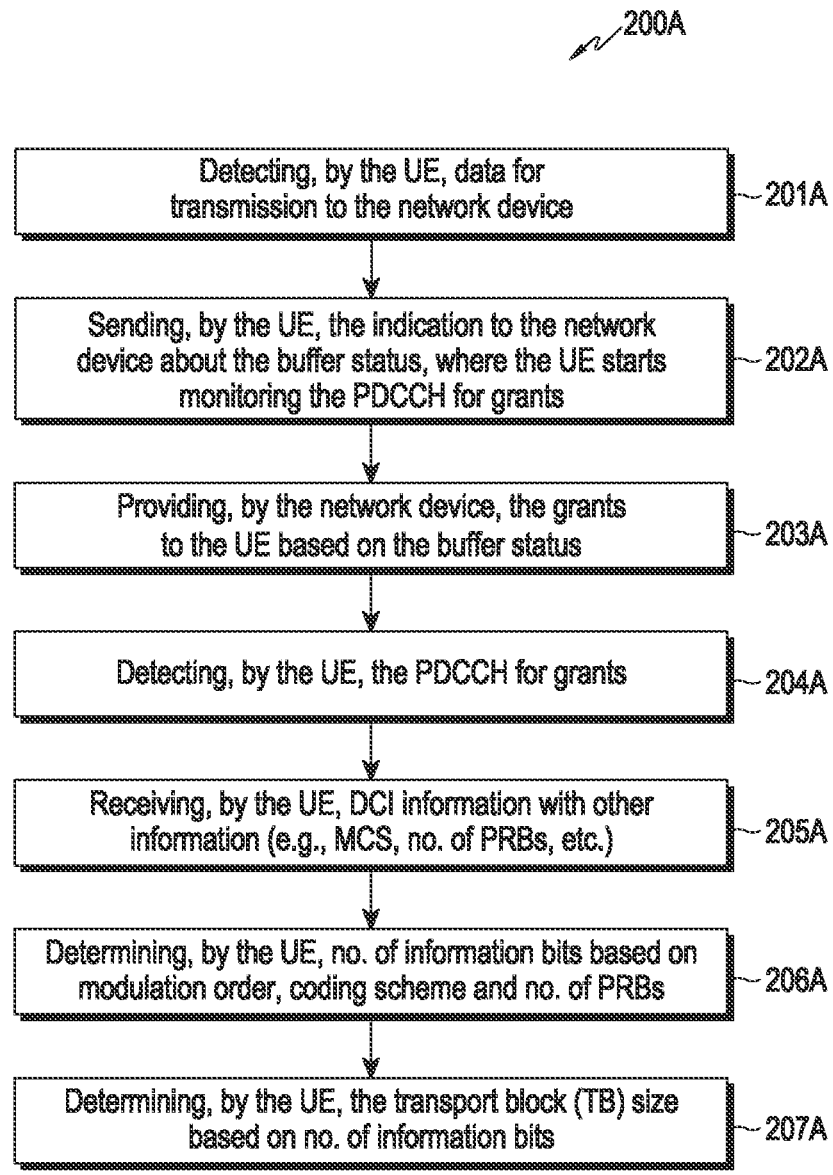
FIG. 2 is a flowchart illustrating a method for selecting a Modulation and Coding Scheme (MCS), number of PRBs, and a size of a transport block in a conventional scheduling mechanism, according to prior art.

FIG. 2 is a flowchart (200A) illustrating a method for selecting the Modulation and Coding Scheme (MCS), the number of PRBs, and the size of a transport block in the conventional scheduling mechanism, according to prior art.

At operation 201A, the method includes detecting, by the UE (50), data for transmission to the network device (10). At operation 202A, the method includes sending, by the UE (50), the indication to the network device (10) about the buffer status, where the UE (50) starts monitoring the PDCCH for grants. At operation 203A, the method includes providing, by the network device (10), the grants to the UE (50) based on the buffer status. At operation 204A, the method includes detecting, by the UE (50), the PDCCH for grants.

At operation 205A, the method includes receiving, by the UE, DCI information with other information (e.g., MCS, number of PRBs, etc.). When the UE (50) detects the PDCCH with a configured DCI format 0_0, 0 1, or 0_2, then the UE (50) must transmit the corresponding PUSCH as indicated by that DCI. In the conventional scheduling mechanism, the DCI provides the UE (50) with necessary information such as physical layer resource allocation, power control commands, HARQ information for both uplink and downlink, MCS, no of PRBs, etc.

At operation 206A, the method includes determining, by the UE (50), number of information bits based on modulation order, coding scheme, and the number of PRBs. At operation 207A, the method includes determining, by the UE (50), the transport block (TB) size based on the number of information bits. To determine the modulation order, target code rate, redundancy version, and transport block size for the physical uplink shared channel, the UE (50) shall first read a 5-bit modulation and coding scheme field ($I_{MCS}$) in the DCI scheduling PUSCH and determines the number of resource REs based on a total number of allocated PRBs for the UE (50). Based on these parameters the UE (50) determines information bits and determines the TB size based on the information bits as defined in TS 38.214 as per a TBS index table, as shown in equation (1).

$$N_{info} = N_{RE} \cdot R \cdot Q_m \cdot v \qquad (1)$$

Where $N_{Info}$ calculates the transport block size using the procedure specified in 3GPP TS-38.214. R and $Q_m$ are obtained from 3GPP TS-38.214 Table 5.1.3.1-1/Table-5.1.3.1-2 based on the MCS Index. R indicates the code rate, $Q_{Im}$ indicates the modulation order, and v indicates the number of layers. According to 3GPP TS-38.214, $N_{RE}$ indicates the number of resource elements.

According to an example embodiment, a method for scheduling shared Physical Resource Blocks (PRBs) in a wireless network during Contention Based Data Transmission (CBDT) is provided. The method includes receiving, by a User Equipment (UE), the PRBs from a network device, where the PRBs are shared among multiple UEs in the wireless network. Further, the method includes detecting, by the UE, data at the UE for transmission. Further, the method includes determining, by the UE, a Modulation and Coding Scheme (MCS), number of PRBs, and a size of a transport block is required for the CBDT in response to detecting the data. Further, the method includes self-scheduling, by the UE, the shared PRBs based on the determined MCS, the number of PRBs, and the size of the transport block. Further, the method includes sending, by the UE, the data to the network device based on the self-scheduling.

According to an example embodiment, a method for scheduling the shared PRBs in the wireless network during the CBDT is provided. The method includes determining, by the network device, a signal condition at the network device based on a plurality of measurement parameters. Further, the method includes determining, by the network device, the MCS, and the number of PRBs required for the CBDT based on a plurality of network parameters. Further, the method includes sending, by the network device, an indication of the determined MCS and the number of PRBs to the UE(s) based on a requirement of the UE(s) and availability of the number of PRBs.

According to an example embodiment, a method for minimizing/reducing contention on the shared PRBs in the wireless network is provided. The method includes determining, by the network device, that the multiple UEs uses the same PRB of the shared PRBs for sending the data to the network device. Further, the method includes minimizing/reducing, by the network device, the contention on the shared PRBs based on a plurality of contention minimization parameters.

According to an example embodiment, a method for minimizing the contention on the PRBs in the wireless network is provided. The method includes receiving, by the UE, the PRBs along with an access control parameter from the network device, where the shared PRBs are shared among the multiple UEs in the wireless network. Further, the method includes detecting, by the UE, the data at the UE for the transmission. Further, the method includes self-scheduling, by the UE, the shared PRBs based on the access control parameter to minimize the contention on the shared PRBs. Further, the method includes sending, by the UE, the data to the network device based on the self-scheduling.

According to an example embodiment a method for minimizing/reducing the contention on the shared PRBs in the wireless network is provided. The method includes receiving, by the UE, the PRBs along from the network device, where the PRBs are shared among the multiple UEs in the wireless network. Further, the method includes detecting, by the UE, the data at the UE for the transmission. Further, the method includes self-scheduling, by the UE, the shared PRBs based on a random selection and/or coordination information to minimize/reduce the contention on the shared PRBs. Further, the method includes sending, by the UE, the data to the network device based on the self-scheduling.

According to an example embodiment, a UE for scheduling the shared PRBs in the wireless network during the CBDT is provided. The UE includes a resource controller coupled with a processor and a memory. The resource controller receives the PRBs from the network device, where the PRBs are shared among the multiple UEs in the wireless network. Further, the resource controller detects the data at the UE for the transmission. Further, the resource controller determines the MCS, the number of PRBs, and the size of the transport block required for the CBDT in response to detecting the data. Further, the resource controller self-schedules the shared PRBs based on the determined MCS, the number of PRBs, and the size of the transport block. Further, the resource controller sends the data to the network device based on the self-scheduling.

According to an example embodiment, a network device for scheduling the shared PRBs in the wireless network during the CBDT is provided. The network device includes a resource controller coupled with a processor and a memory. The resource controller determines the signal condition at the network device based on the plurality of measurement parameters. Further, the resource controller determines the MCS, and the number of PRBs is required for the CBDT based on the plurality of network parameters. Further, the resource controller includes sends the indication of the determined MCS and the number of PRBs to the UE(s) based on the requirement of the UE(s) and the availability of the number of PRBs.

According to various example embodiments, a network device for minimizing/reducing the contention on the shared PRBs in the wireless network. The network device includes the resource controller coupled with the processor and the memory. The resource controller determines that the multiple UEs uses the same PRB of the shared PRBs for sending the data to the network device. Further, the resource controller minimizes/reduces the contention on the shared PRBs based on the plurality of contention minimization parameters.

According to an example embodiment, a UE for minimizing/reducing the contention on the shared PRBs in the wireless network is provided. The UE includes the resource controller coupled with the processor and the memory. The resource controller receives the PRBs along with an access control parameter from the network device, where the PRBs are shared among the multiple UEs in the wireless network. Further, the resource controller includes detects the data at the UE for the transmission. Further, the resource controller self-schedules the shared PRBs based on the access control parameter to minimize/reduce the contention on the shared PRBs. Further, the resource controller sends the data to the network device based on the self-scheduling.

According to an example embodiment, a UE for minimizing/reducing the contention on the shared PRBs in the wireless network is provided. The UE includes the resource controller coupled with the processor and the memory. The resource controller receives the PRBs along with an access control parameter from the network device, where the PRBs are shared among the multiple UEs in the wireless network. Further, the resource controller includes detects the data at the UE for the transmission. Further, the resource controller self-schedules the shared PRBs based on the random selection and/or the coordination information to minimize/reduce the contention on the shared PRBs. Further, the resource controller sends the data to the network device based on the self-scheduling.

Unlike existing methods and systems, the disclosed method allows the UE to determine the Modulation and Coding Scheme (MCS), the number of PRBs, and the size of the transport block based on with and without network assistance for a shared resource mechanism (e.g., CBDT) upon detecting the data for the transmission (e.g., uplink transmission). The UE self-schedules the shared PRB based on the determined MCS, the number of PRBs, and the size of the transport block. As a result, the method improves user experience by reducing scheduling delays during Non-Terrestrial Network (NTN) transmission/CBDT (e.g., Internet of Things (IoT) traffic, Voice over Internet Protocol (VoIP) traffic).

Unlike existing methods and systems, the disclosed method allows the UE to send self-scheduling information to the network device. The self-scheduling information indicates the used PRB of the shared PRB for the data transmission and the used MCS for the data transmission.

Unlike existing methods and systems, the disclosed method determines the MCS, and the number of PRBs, by the network device, is required for the CBDT based on the plurality of measurement parameters and the plurality of network parameters. The plurality of measurement parameters includes an uplink channel state information (CSI), an uplink Sounding Reference Signal (SRS), and an uplink Channel Quality Indicator (CQI) information. The plurality of network parameters includes a type of traffic, a ratio of an Acknowledgement (ACK) and a Negative Acknowledgement (NACK), and a radio condition. The network device sends an indication of the determined MCS and the number of PRBs to the UE based on the requirement of the UE(s) and an availability of the number of PRBs at the network device.

Unlike existing methods and systems, the disclosed method allows the UE/network device to minimize the contention on the shared PRB based on the plurality of contention minimization parameters and/or an access control parameter and/or a random selection and/or coordination information. The plurality of contention minimization parameters includes a high Signal-to-Interference-plus-Noise Ratio (SINR) and Block error rate (BLER), a type of data application, and size of the transport block. The access control parameter includes a Contention Based Data Transmission (CBDT) barring factor and a CBDT barring timer. As a result, the method improves the user experience by minimizing the contention during the NTN transmission/CBDT.

Referring now to the drawings and more particularly to FIGS. 3 through 8, where similar reference characters denote corresponding features consistently throughout the figures, there are shown various example embodiments.

Figure 3:
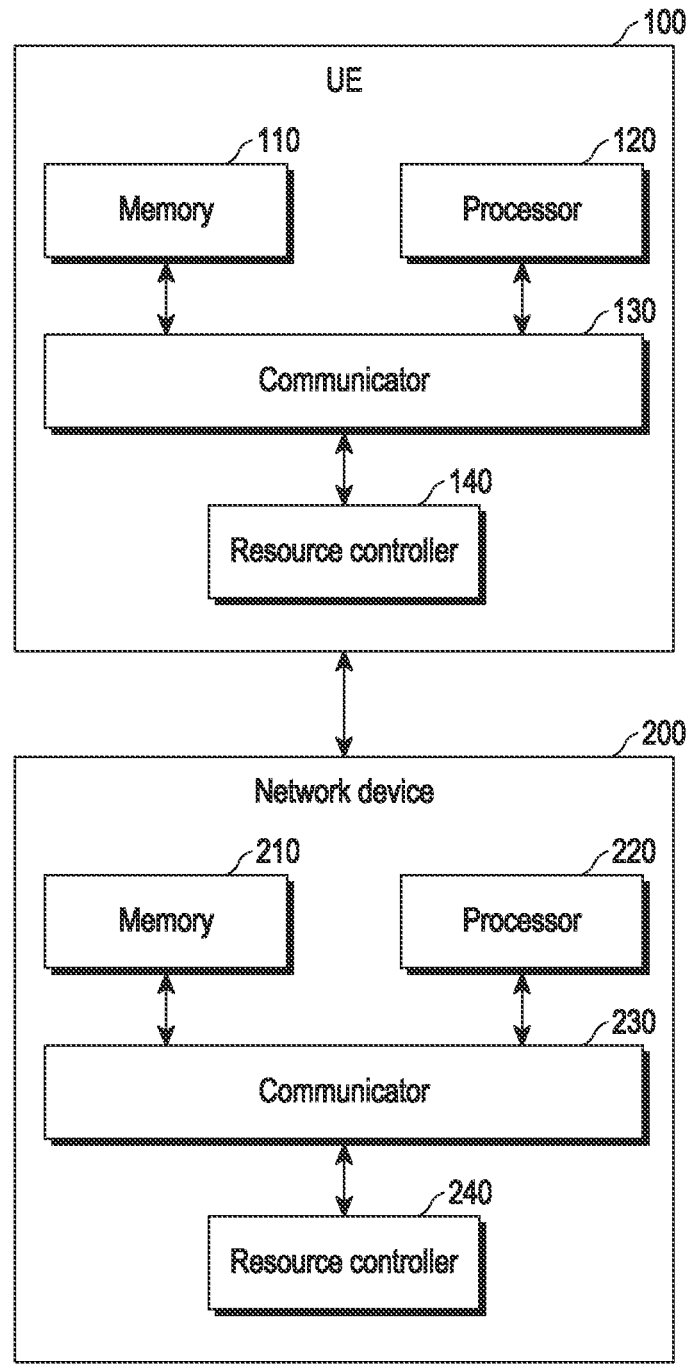
FIG. 3 is a system block diagram illustrating an example configuration for scheduling a shared PRB in a wireless network during Contention Based Data Transmission (CBDT) and minimizing contention on the shared PRB, according to various embodiments.

FIG. 3 is a system block diagram illustrating an example configuration for scheduling a shared PRB in a wireless network during Contention Based Data Transmission (CBDT) and minimizing/reducing contention on the shared PRB, according to various embodiments. The system block diagram includes a User Equipment (UE) (100) and a network device (200).

Examples of the UE (100) include, but are not limited to, a smartphone, a tablet computer, a Personal Digital Assistance (PDA), an Internet of Things (IoT) device, a wearable device, etc. Examples of the network device (200) include, but are not limited to, a server, a base station, a gNodeB (gNB), a cloud network, etc.

In an embodiment, the UE (100) includes a memory (110), a processor (e.g., including processing circuitry) (120), a communicator (e.g., including communication circuitry) (130), and a resource controller (e.g., including various processing circuitry and/or executable program instructions) (140).

In an embodiment, the memory (110) stores the shared Physical Resource Blocks (PRBs), a Modulation and Coding Scheme (MCS), a number of PRBs, a size of a transport block, an uplink channel state information (CSI), an uplink Channel Quality Indicator (CQI) information, a downlink CSI and a downlink CQI information, a buffer status available at a Medium Access Control (MAC) layer, a Radio link control (RLC) layer and a Packet Data Convergence Protocol (PDCP) layer, an access control parameter, a random selection, and coordination information. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the UE (100), a cloud storage, or any other type of external storage.

The processor (120) may include various processing circuitry and communicates with the memory (110), the communicator (130), and the resource controller (140). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) may include various communication circuitry and is configured for communicating internally between internal hardware components and with external devices (e.g. eNodeB, gNodeB, server, etc.) via one or more networks (e.g. Radio technology). The communicator (130) includes an electronic circuit specific to a standard that enables wired or wireless communication.

The resource controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The resource controller (140) and the processor (120) may be integrally referred to as at least one processor.

In an embodiment, the resource controller (140) receives the shared PRBs (e.g. CBDT resources) from the network device (200), where the shared PRBs are shared among multiple UEs (100a-100n) in the wireless network. The resource controller (140) detects data at the UE (100) for transmission (e.g., uplink data transmission). The resource controller (140) determines the MCS, the number of PRB, and the size of the transport block required for the CBDT in response to detecting the data. The resource controller (140) self-schedules the shared PRBs based on the determined MCS, the number of PRBs, and the size of the transport block. The resource controller (140) sends the data to the network device (200) based on the self-scheduling.

Furthermore, the resource controller (140) determines a signal condition at the UE (100). The resource controller (140) determines the size of the data for transmission. The resource controller (140) determines the MCS based on the signal condition and the size of the data.

Furthermore, the resource controller (140) determines whether the wireless network utilizes a Frequency Division Duplex (FDD) or Time Division Duplex (TDD). The resource controller (140) determines the uplink CSI and/or the uplink CQI information in response to determining that the wireless network utilizes the FDD, where the uplink CSI and/or the uplink CQI information receives from the network device (200) based on a requirement of the UE (100) or determines the downlink CSI and the downlink CQI information in response to determining that the wireless network utilizes the TDD to determine the uplink CSI and the CQI. The resource controller (140) determines the signal condition at the UE (100) based on, one or more, the uplink CSI and the uplink CQI information, and the downlink CSI and the downlink CQI information.

The uplink CSI and the downlink CSI includes one or more, the CQI, a Precoding Matrix Indicator (PMI), a Rank Indicator (RI), a Level-1 Reference Signal Received Power (L1-RSRP), and a Level-1 Signal to Interference and Noise Ratio (L1-SINR).

Furthermore, the resource controller (140) determines the buffer status available at the MAC layer, the RLC layer, and the PDCP layer. The resource controller (140) determines the size of the transport block based on the available buffer status.

Furthermore, the resource controller (140) determines the number of PRB based on, one or more, the size of the transport block and a network indication in a Radio Resource Control (RRC) message or a Downlink Control Information (DCI) message. The resource controller (140) sends self-scheduling information to the network device (200), where the self-scheduling information indicates the used PRB of the shared PRBs for the data transmission and/or the used MCS for the data transmission.

Furthermore, the resource controller (140) receives the PRBs along with the access control parameter from the network device (200), where the PRBs are shared among multiple UEs (100a-100n) in the wireless network. The access control parameter includes a Contention Based Data Transmission (CBDT) barring factor and a CBDT barring timer. The CBDT barring factor restricts access to the shared PRBs, and the CBDT barring timer prevents the UE (100) from using the shared PRBs until the CBDT barring timer expires. The resource controller (140) detects the data at the UE (100) for transmission. The resource controller (140) self-schedules the shared PRBs based on the access control parameter to minimize contention on the shared PRBs. The resource controller (140) sends the data to the network device (200) based on the self-scheduling.

Furthermore, the resource controller (140) receives the PRBs from the network device (200), where the PRBs are shared among multiple UEs (100a-100n) in the wireless network. The resource controller (140) detects the data at the UE (100) for transmission. The resource controller (140) self-schedules the shared PRBs based on the random selection and the coordination information to minimize contention on the shared PRBs. The resource controller (140) sends the data to the network device (200) based on the self-scheduling.

In an embodiment, the network device (200) includes a memory (210), a processor (e.g., including processing circuitry) (220), a communicator (e.g., including communication circuitry) (230), and a resource controller (e.g., including various processing circuitry and/or executable program instructions) (240).

In an embodiment, the memory (210) stores the shared PRBs, the MCS, the number of PRB, the size of a transport block, the uplink CSI, the CQI information, the downlink CSI and the downlink CQI information, the buffer status, the access control parameter, the random selection, the coordination information, a plurality of measurement parameters, a plurality of network parameters, and a plurality of contention minimization parameters. The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). The memory (210) can be an internal storage unit or it can be an external storage unit of the network device (200), a cloud storage, or any other type of external storage.

The processor (220) may include various processing circuitry and communicates with the memory (210), the communicator (230), and the resource controller (240). The processor (220) is configured to execute instructions stored in the memory (210) and to perform various processes. The processor (220) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230) may include various communication circuitry and is configured for communicating internally between internal hardware components and with external devices (e.g. eNodeB, gNodeB, server, UE(s), etc.) via one or more networks (e.g. Radio technology). The communicator (230) includes an electronic circuit specific to a standard that enables wired or wireless communication.

The resource controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The resource controller (240) and the processor (220) may be integrally referred to as at least one processor.

In an embodiment, the resource controller (240) determines a signal condition at the network device (200) based on the plurality of measurement parameters. The plurality of measurement parameters includes, one or more, the uplink CSI, an uplink Sounding Reference Signals (SRS), and the uplink CQI information. The resource controller (240) determines the MCS, and the number of PRB is required for the CBDT based on the plurality of network parameters. The plurality of network parameters includes, one or more, a type of traffic, a ratio of an Acknowledgement (ACK) and a Negative Acknowledgement (NACK), and a radio condition. The resource controller (240) sends an indication of the determined MCS and the number of PRB to the UE (100) based on a requirement of the UE (100) and an availability of the number of the PRBs. The UE (100) receives the indication from the network device (200) periodically, a-periodically, or semi-persistently Furthermore, the resource controller (240) pre-configures a fixed MCS for the CBDT for the UE (100) and/or a group of UEs. The resource controller (240) pre-configures a common MCS for the CBDT for the UE (100) and the group of UEs.

Furthermore, the resource controller (240) determines that multiple User Equipment (UE) (100a-100n) uses the same PRB of the shared PRB for sending the data to the network device (200). The resource controller (240) minimizes the contention on the shared PRBs based on the plurality of contention minimization parameters. The plurality of contention minimization parameters includes, one or more, a high Signal-to-Interference-plus-Noise Ratio (SINR) and Block error rate (BLER), a type of data application, and the size of the transport block.

Although FIG. 3 shows various hardware components of the system block diagram but it is to be understood that other embodiments are not limited thereon. In other embodiments, the system block diagram may include less or more number of components. Further, the labels or names of the components are used only for illustrative purpose and does not limit the scope of the disclosure. One or more components can be combined together to perform same or substantially similar function to schedule the shared PRBs and minimize the contention on the shared PRBs.

Figure 4:
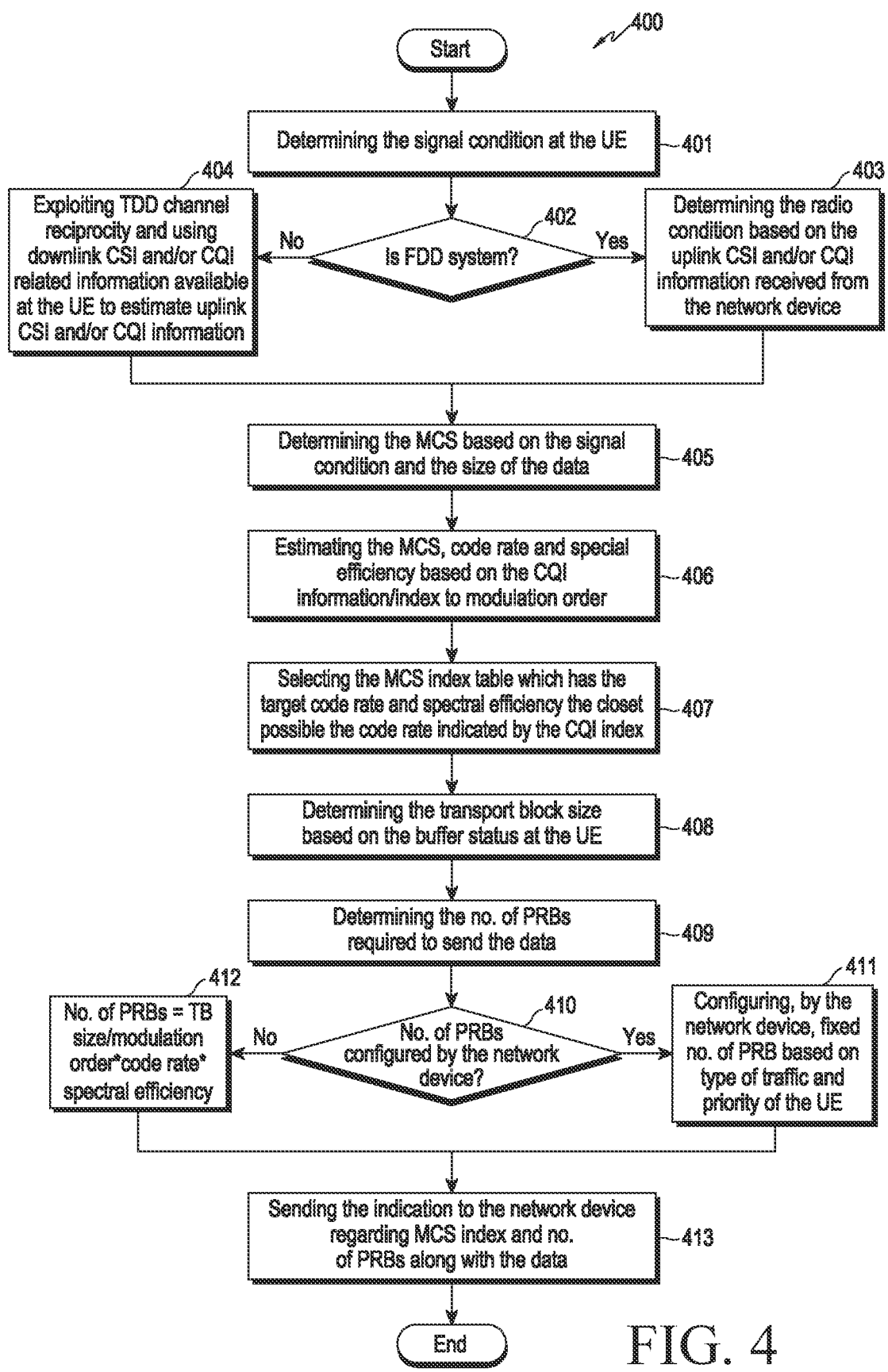
FIG. 4 is a flowchart illustrating an example method for scheduling the shared PRB in the wireless network during the CBDT, according to various embodiments.

FIG. 4 is a flowchart (400) illustrating an example method for scheduling the shared PRB in the wireless network during the CBDT, according to various embodiments.

In an embodiment, the MCS and the number of PRBs required for the data transmission in the uplink are determined by the UE (100). The network device (200) may specify the type of MCS table that the UE (100) will use to determine the MCS in the RRC message. The number of PRBs, the modulation scheme, the signal condition, and the data size are required for the UE (100) to determine the transport block size.

At operation 401, the method includes determining the signal condition at the UE (100). The UE (100) requires the uplink CSI and/or CQI information to determine the MCS and the PRBs for the data transmission on the shared PRBs. At operation 402, the UE (100) determines whether the wireless network utilizes the FDD system or the TDD system. At operation 403, if the wireless network is the FDD system, then the network device (200) may periodically/a-periodically/semi-persistently feedback the uplink CSI and/or CQI information to the UE (100) based on the UE's requirements (e.g., nature of traffic, UE signal conditions, etc.). The CSI can be comprised of the CQI, PMI, RI, L1-RSRP, or L1-SINR. At operation 404, if the wireless network is the TDD system, the UE (100) may also exploit TDD channel reciprocity and estimate the uplink CSI and/or CQI information available at the UE (100) for the MCS determination, in which case UL CSI feedback from the network device (200) is not required.

For Type I, Type II, and Enhanced Type II CSI feedback on PDSCH (by the gNodeB (e.g., the network device (200)) to the UE (100)), a CSI report may comprise two parts as done for PUSCH CSI feedback or sent in a single part.
    a. UL CSI reporting by the gNodeB in multiple parts. Part 1 has a fixed payload size and is used to identify the number of information bits in Part 2. Part 1 shall be transmitted in its entirety before Part 2.
        i. For Type I CSI feedback, Part 1 contains RI (if reported), CRI (if reported), and CQI for the first code word (if reported). Part 2 contains PMI (if reported) and contains the CQI for the second code word (if reported) when RI (if reported) is larger than 4.
    b. UL CSI reporting by the gNodeB in a single part.
    c. UL CSI reporting may contain only RI (if reported), CRI (if reported), and CQI for the first.
        i. Or UL CSI reporting may contain the full enhanced CSI report as described above.

At operation 405, the method includes determining the MCS based on the signal condition and the size of the data. To determine the MCS, the UE (100) must be aware of the signal condition. The UE (100) uses the downlink CSI and CQI information reported by the network device (200) if the FDD system is used, or the TDD channel reciprocity available if the TDD system is used, to determine the MCS, which can be a Quadrature Phase Shift Keying (QPSK), 64-Quadrature Amplitude Modulation (QAM) and so on. At operation 406, the method includes estimating the MCS, the code rate, and spectral efficiency based on the CQI information/index to modulation order. The CQI information to the modulation order can provide an estimated modulation scheme, the code rate, and the spectral efficiency. At operation 407, the method includes selecting the MCS index table which has the target code rate and the spectral efficiency the closest possible the code rate indicated by the CQI index. The UE (100) utilizes the IMCS table (e.g., MCS index table) as defined in TS 38.214 to determine the modulation order (Qm) and the target code rate (R) used for a physical uplink shared channel The MCS index selected through the IMCS table has the target code rate and the spectral efficiency the closest possible to the code rate indicated by the CQI information/index. The UE (100) stores this set of MCS indexes and used it to determine the transport block size.

At operation 408, the method includes determining the transport block size based on the buffer status at the UE (100). The UE (100) is aware of the data size based on the buffer status available at the MAC, the RLC, and the PDCP. Once data is triggered, the UE (100) should select the transport block size that is best suited to the buffer status or amount of data generated.

At operations 409, 410, 411 and 412, the method includes determining the number of PRBs required to send the data based on the transport block size (operation 409, operation 410, and operation 412) and/or the network indication in the RRC message or the DCI message (operation 409, operation 410, and operation 411).

Determining the number of PRBs based on the transport block size: Based on a selection of transport block size, the UE (100) can determine the number of PRBs required to send the data as determined by the below equation (2), $$\text{Total number of REs required} = \text{Number of information bits/modulation order} * \text{code rate} * \text{spectral efficiency} \quad (2)$$

Where number of information bits can be estimated from the transport block size, the modulation order, the code rate, and the spectral efficiency determine based on the MCS index that is selected as defined above. Number of the PRBs which are required to send the data are determined by the below equation (3), $$\text{Number of PRBs} = \text{Total number of REs allocated}/\min(156, \text{No of REs allocated for PUSCH within a PRB}(n'_{RE}))) \quad (3)$$

Where Number of REs allocated for PUSCH within a PRB ($N'_{RE}$)) can be determined as defined in TS 38.214, in simple terms:

$$\text{Number of PRBs} = \text{transport block size/modulation order} * \text{code rate} * \text{spectral efficiency} \quad (4)$$

Determining the number of PRBs based on the network indication in the RRC message or the DCI message: The network device (200) sends the number of PRB that the UE (100) can use and the MCS index in the RRC message. These number of PRBs can be fixed for each user so that sharing scheme can be benefitted for multiple users. These number can be valid of certain periodicity or can be valid until sharing scheme is valid. The network device (200) determines the number of PRBs and the MCS index based on channel conditions and the amount of data the UE (100) is sending. Once the PRBs are fixed, the network device (200) uses that number of PRBs to send the data. Another possible option is while configuring a set of PRBs, the network device (200) may configure in the RRC message how many PRBs the UE (100) can use. Once the UE (100) determines the PRBs based on the MCS index, the UE (100) determines the transport block size and sends the data.

At operation 413, the method includes sending the indication to the network device (200) regarding the MCS index and the number of PRBs along with the data.

In an embodiment, the UE (100) determines the MCS itself, the network device (200) does not provide the MCS or the number of PRBs allocated to the UE (100). The network device (200) provides only the number of PRBs for the CBDT transmission. The UE (100) schedules itself on the number of PRBs (e.g., CBDT resources). Then, the UE (100) indicates both, the PRBs used by the UE (100) for the data transmission on CBDT resources as well as the MCS used for the uplink data transmission on the CBDT resources to the network device (200).

In an embodiment, the UE (100) may explicitly indicate the MCS used for the CBDT transmission using the uplink control RBs allocated with the CBDT resources using the 5-bit modulation and coding scheme field (IMCS). The MCS Index is referred to as IMCS in this context. MCS Index is read from Downlink Control Information (DCI) in conventional 5G NR (with scheduled transmissions), and Qm (Modulation Scheme) and R (Code Rate) are obtained from Table 5.1.3.1-1/Table 5.1.3.1-2 in 3GPP TS-38.214. In the disclosed method, IMCS is determined by the UE (100) (as part of the CBDT scheme's self-scheduling procedure), and the UE (100) may explicitly indicate the MCS used for CBDT transmission using the uplink control RBs allocated with the CBDT resources using the 5-bit modulation and coding scheme field (IMCS). However, as with the conventional procedure, the UE (100) will obtain Qm (Modulation Scheme) and R (Code Rate) from Table 5.1.3.1-1/Table 5.1.3.1-2 in 3GPP TS-38.214. An independent UCI format may be defined for indicating the self-scheduling information by the UE (100). The UE (100) sends this information in the PUSCH where the initial part of the PRB carries the MCS index and the number of PRBs used for the data transmission and then actual data so that when the network device (200) receives, the network device (200) is aware of the MCS index used for the data transmission.

Figure 5A:
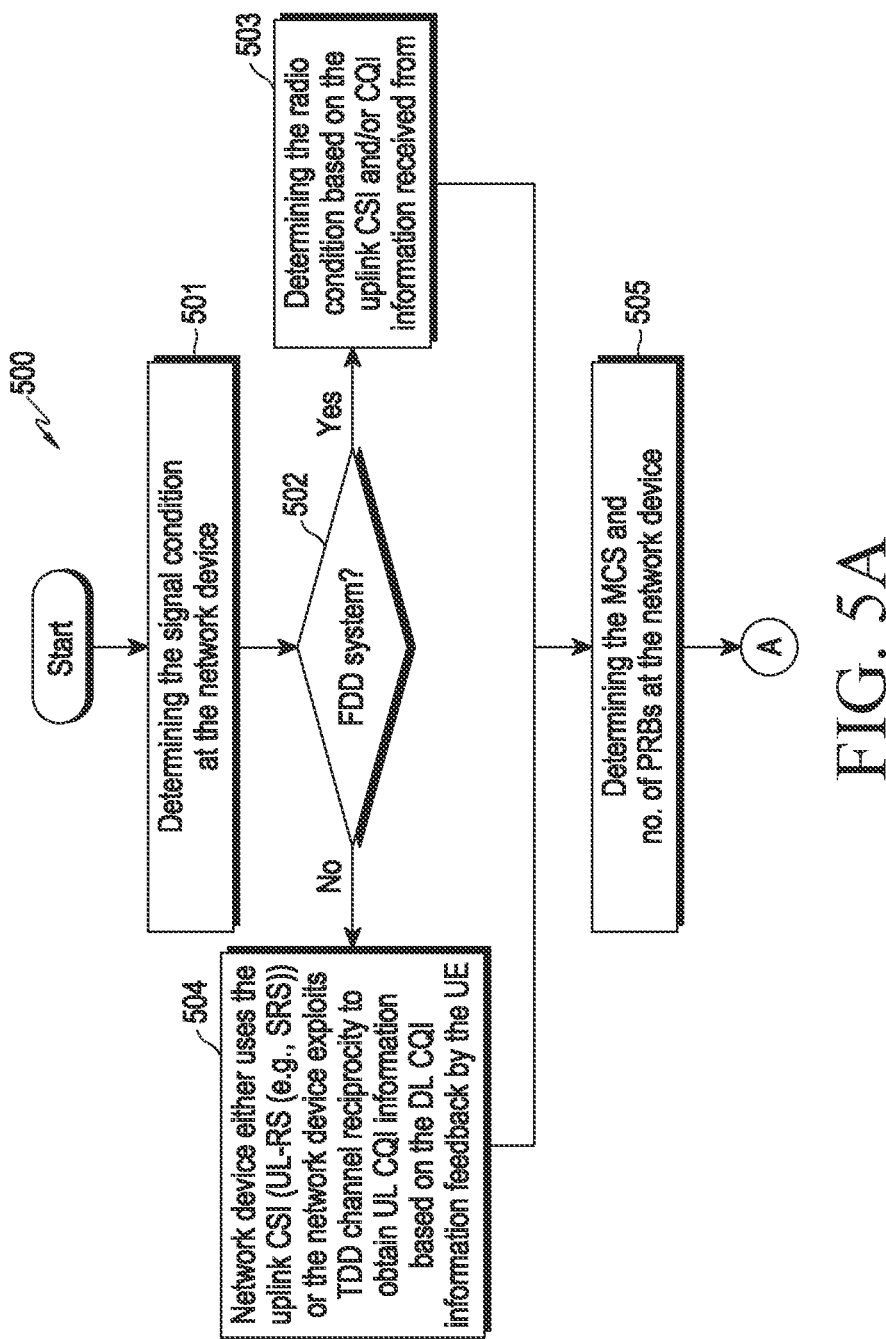
FIGS. 5A and 5B are a flowchart illustrating an example method for network-assisted scheduling the shared PRB in the wireless network during the CBDT, according to various embodiments.
Figure 5B:
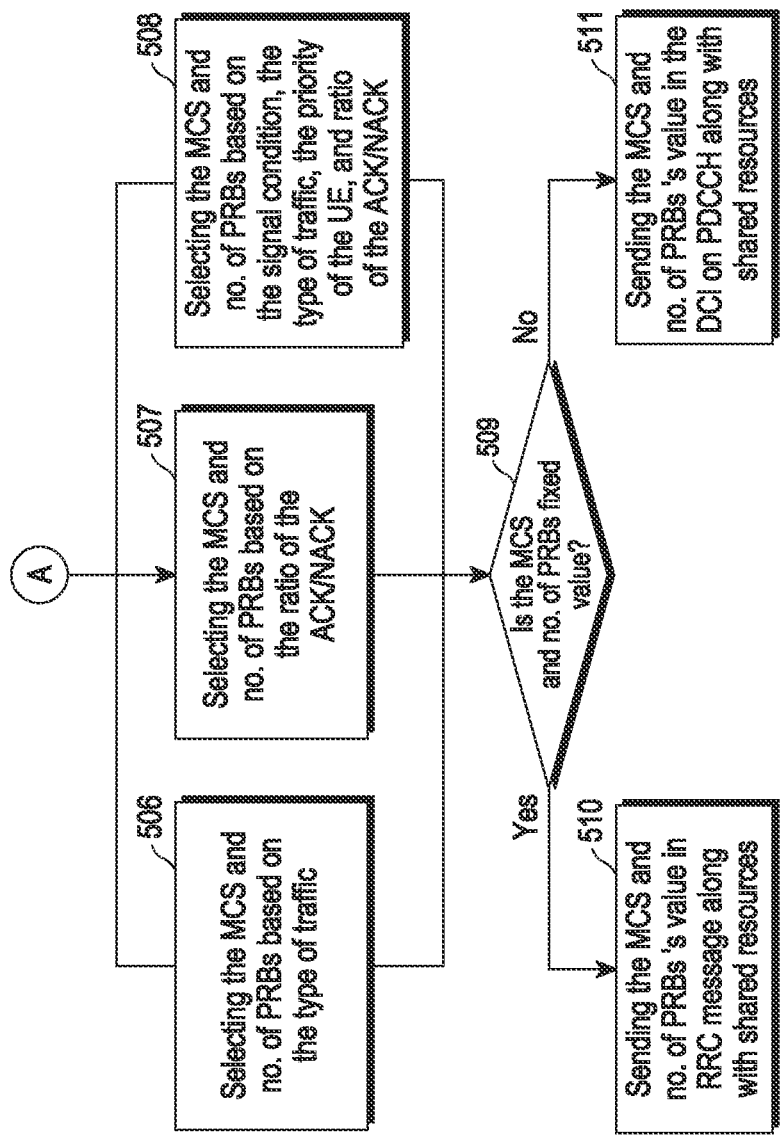

FIGS. 5A and 5B are a flowchart (500) illustrating an example method for network-assisted scheduling the shared PRB in the wireless network during the CBDT, according to various embodiments.

At operations 501, 502, 503 and 504, the method includes determining the signal condition at the network device (200) based on the plurality of measurement parameters. The plurality of measurement parameters includes the uplink CSI, the uplink SRS, and the uplink CQI information. At operation 501, the network device (200) considers the UL CSI reports from the UE (100) to determine the signal condition at the network device (200) as per conventional art. The network device (200) requires uplink CSI measurements to determine appropriate MCS for the UE (100) for the data transmission on the CBDT resources. At operation 502, the network device (200) determines whether the wireless network utilizes the FDD system or the TDD system. At operation 503, if the wireless network is the FDD system, the method includes determining, the network device (200), and the radio condition based on the uplink CSI and/or CQI information sent by the UE (100). At operation 504, if the wireless network is the TDD system, the method includes utilizing, by the network device (200), either the uplink CSI (UL-RS (e.g., SRS)) or the network device (200) exploits TDD channel reciprocity to obtain UL CQI information based on the DL CQI information feedback by the UE (100).

At operations 505, 506, 507 and 508, the method includes determining the MCS and the number of PRBs at the network device (200) based on the plurality of network parameters. The plurality of network parameters includes the type of traffic, the ratio of the ACK and the NACK, and the radio condition.

Determining the MCS and the number of PRBs based on the type of traffic (506): Allocation of the PRBs for the CBDT by the network device (200) may be based on the type of traffic. For example, IoT users may expect more improvement in user latency due to short-duration traffic bursts compared to relatively continuous video traffic users. The network device (200) may, therefore, account for the user's traffic type while allocating resources to the UE (100) or a group of UEs.

Determining the MCS and the number of PRBs based on the ratio of the ACK and the NACK (507): Allocation of the PRBs for the CBDT by the network device (200) may be based on the ACK/NACK and/or based on the previous allocation. For example, the network device (200) may allocate more RBs to the UE (100) for which past transmission resulted in NACK, UEs signal condition (CSI/CQI), etc.

Determining the MCS and the number of PRBs based on the radio condition (508): Allocation of the PRBs for the CBDT by the network device (200) may be based on the radio condition and/or combination (operations 506, 507, and 508).

At operation 509, the method includes determining whether the MCS and the number of PRBs have fixed values or not. At operation 510, the method includes sending the MCS and the number of PRBs' value in the RRC message along with the shared resources in response to determining that the MCS and the number of PRBs do not have a fixed value. At operation 511, the method includes sending the MCS and the number of PRBs' value in the DCI on PDCCH along with shared resources in response to determining that the MCS and the number of PRBs have fixed values.

In an embodiment, the network device (200) may also pre-configure a fixed MCS for the uplink CBDT for the UE (100) or the group of UEs. The network device (200) may either use UL RS measurements or the UL CSI feedback by the UE (100) for the TDD system to determine the MCS for the CBDT transmissions. In the latter case, the CSI feedback by the UE (100) may be, a. For Type I, Type II and enhanced Type II CSI feedback on the PUSCH, the CSI report includes two parts. Part-1 has a fixed payload size and is used to identify the number of information bits in Part-2. Part-1 shall be transmitted in its entirety before Part-2.

b. For the Type I CSI feedback, Part-1 contains RI (if reported), CRI (if reported), and CQI for the first code word (if reported). Part-2 contains PMI (if reported) and contains the CQI for the second code word (if reported) when RI (if reported) is larger than 4.

c. For the Type II CSI feedback, Part-1 contains RI (if reported), CQI, and an indication of the number of non-zero wideband amplitude coefficients per layer for the Type II CSI (see Clause 5.2.2.2.3). The fields of Part-1, RI (if reported), CQI, and the indication of the number of non-zero wideband amplitude coefficients for each layer are separately encoded. Part 2 contains the PMI of the Type II CSI. Part-1 and Part-2 are separately encoded.

d. For the enhanced Type II CSI feedback, Part-1 contains RI, CQI, and an indication of the overall number of non-zero amplitude coefficients across layers for the Enhanced Type II CSI (see Clause 5.2.2.2.5). The fields of Part-1—RI, CQI, and the indication of the overall number of non-zero amplitude coefficients across layers—are separately encoded. Part 2 contains the PMI of the Enhanced Type II CSI. Part-1 and Part-2 are separately encoded.

In an embodiment, the network device (200) then indicates the determined MCS scheme to the UE (100) periodically/a-periodically/semi-persistently depending on the requirements of the UE (100) and resource availability.

In an embodiment, the network device (200) may indicate the MCS scheme to each UE on dedicated resources.

In an embodiment, the network device (200) may also determine common MCS for a group of UEs or all UEs and multi-cast or broad-cast the MCS information for uplink CBDT resources. For example, the network device (200) may select a fixed MCS for uplink contention-based data transmission for all UEs and indicate the same to the UEs via SI broad-cast/multi-cast. The network device (200) may provide UEs or a group of UEs with 5-bit MCS field to determine the modulation order and target code rate based on the procedure defined in TS-38.214. The number of layers and the total number of allocated CBDT PRBs may also be indicated commonly to UEs or a group of UEs.

In an embodiment, the network device (200) indicates the MCS scheme for uplink contention-based data transmission with the CBDT RB map provided to the UE (100) for CBDT resource allocation. In this case, the MCS scheme is updated each time a new CBDT RB map is provided by the network device (200). In this method, to determine the modulation order, target code rate, redundancy version, and transport block size for the CBDT transmission on the physical uplink shared channel, the UE (100) shall first read the 5-bit modulation and coding scheme field in the control information scheduling CBDT transmission on the PUSCH to determine the modulation order and target code rate (R) based on the procedure defined in Clause 6.1.4.1, TS-38.214. For supporting CBDT, the following MCS allocation strategies need to be defined besides the method defined in Clause 6.1.4.1, TS-38.214.

a. When the UE (100) is configured with MCS-C-RNTI, and the CBDT RBs availability is indicated by the PDCCH,
  i. The UE (100) shall use IMCS and Table 5.1.3.1-3 to determine the modulation order ($Q_m$) and the target code rate (R) used in the physical uplink shared channel for CBDT transmission.

b. else if, for a combined CBDT PUSCH transmission (sends UE self-scheduling information and UL CBDT data-transmission in same UL message),
  i. The UE (100) shall use pre-specified parameters to determine $I_{MCS}$ and Table 5.1.3.1-1 to determine the target code rate (R) used in the physical uplink shared channel for CBDT transmission.

c. Else, the UE (100) shall use $I_{MCS}$ and Table 5.1.3.1-1 to determine the modulation order ($Q_m$) and the target code rate (R) used in the physical uplink shared channel.

In an embodiment, an independent DCI format may also be defined to indicate resource allocation for CBDT. The network device (200) also indicates the number of layers, and the PRBs to the UE (100) to determine the transport block size based on the procedure defined in Clause 6.1.4.2, 3GPP TS-38.214.

In an embodiment, in an event the UE (100) has uplink data but does not have dedicated uplink resources for data transmission, the UE (100) uses the MCS scheme indicated by the network device (200) to determine the transport block size for the uplink data transmission on CBDT resources. The other operations as defined above are valid in this case also.

Figure 6:
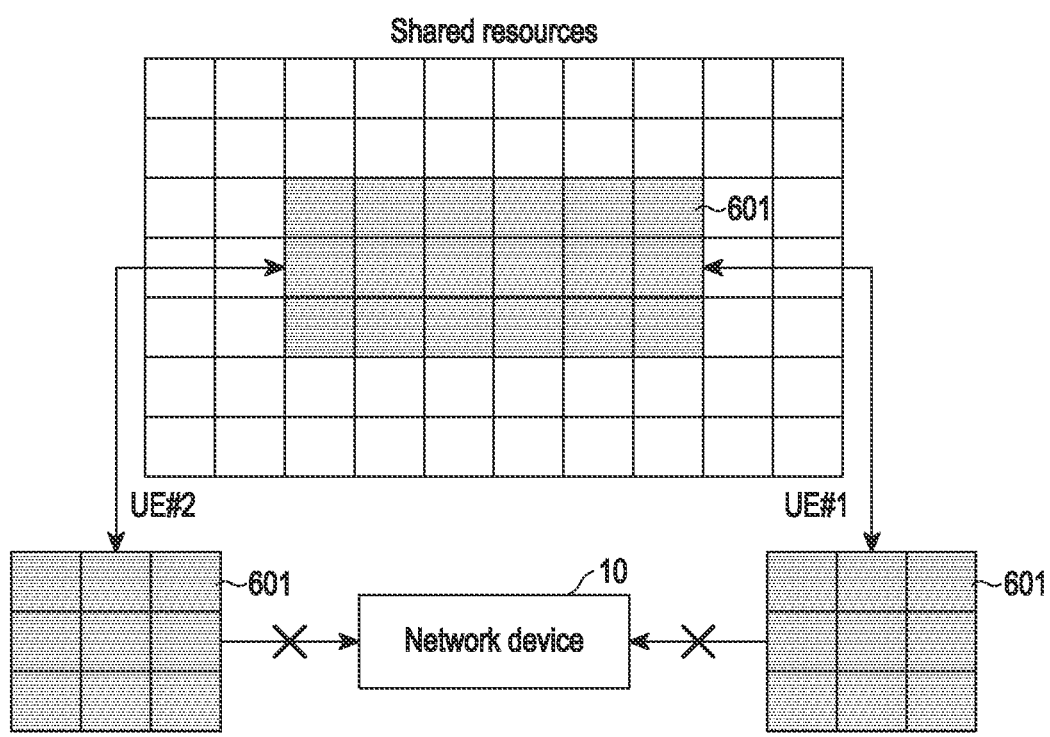
FIG. 6 is a diagram illustrating another problem in the contention-based grants provided in the NTN, according to prior art.

FIG. 6 is a diagram illustrating another problem in the contention-based grants provided in the NTN, according to prior art.

When multiple UEs (50) (e.g., UE #1 and UE #2) uses the same set of PRBs (601) in the case of the shared resource mechanism at the same time, there are high chances that contention will happen at the network device (10) and the network device (10) will discard all the data packets.

In the conventional scheduling mechanism, the UE (50) always has dedicated resources as a result there is no case of contention. When the multiple UEs (50) use the same set of PRBs (601) in case of share shared resource mechanism at the same time there are high chances that contention will happen at the network device (10). The UE (50) has the flexibility to select any of PRB among the configured set of resources. There can be two types of resources one is data PRB and the other is control PRB. The control PRB informs about the MCS index and number of PRBs while the data PRB carries actual data. The network device (10) can first check the control PRBs and found if there is any contention then typically discards that particular packet. The problem is the network device (10) will discard the data of all the UEs which has access to the common resources. The network device (10) should ideally accept at least access to one UE with shared resources, which is a major drawback of the existing method. So, there is a need to define the mechanism which ensures that there is less contention at the network device (10) and contention resolution at the network device (10).

Figure 7A:
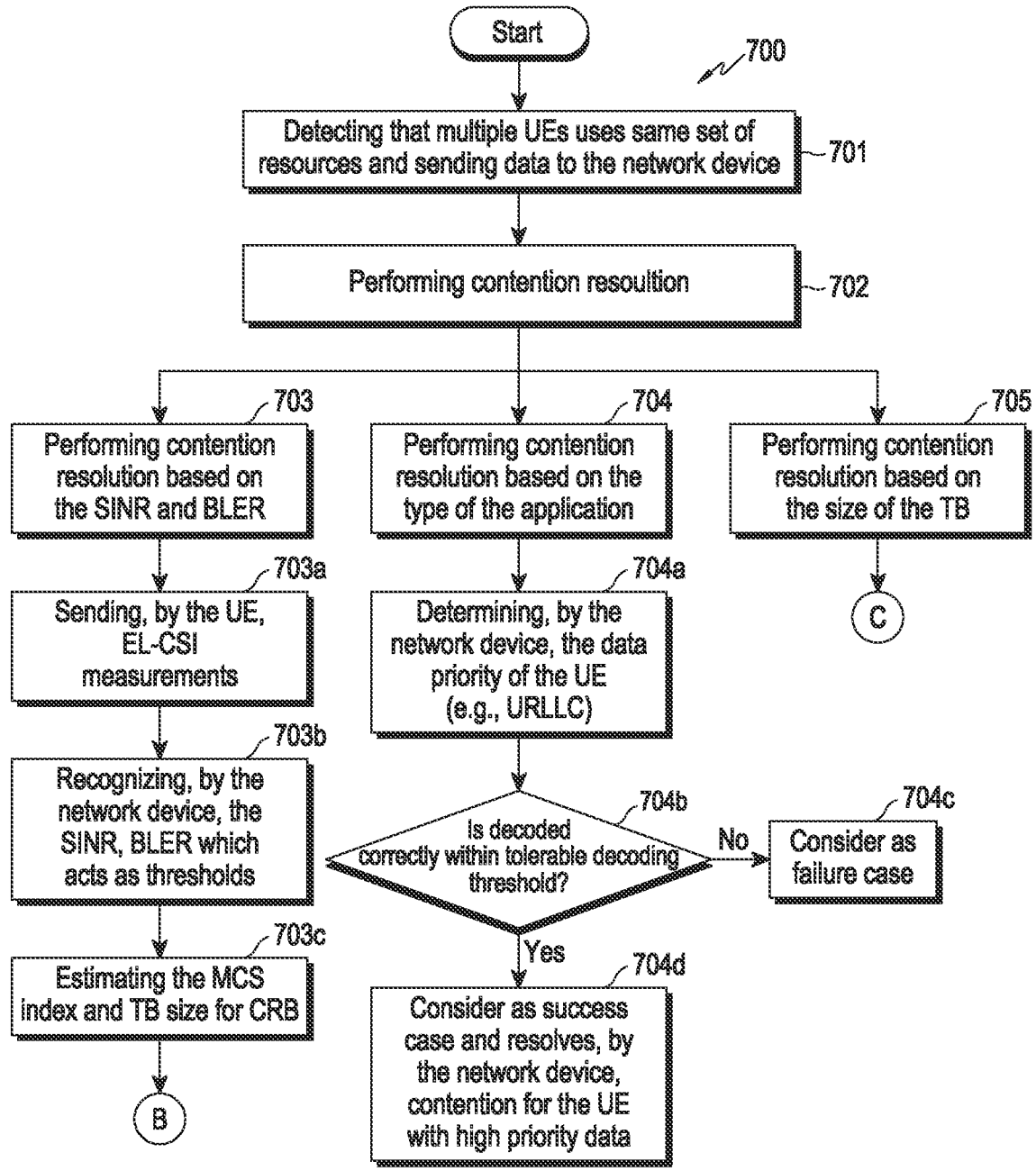
FIGS. 7A and 7B are a flowchart illustrating an example method for minimizing the contention on the shared PRB based on a network decision, according to various embodiments.
Figure 7B:
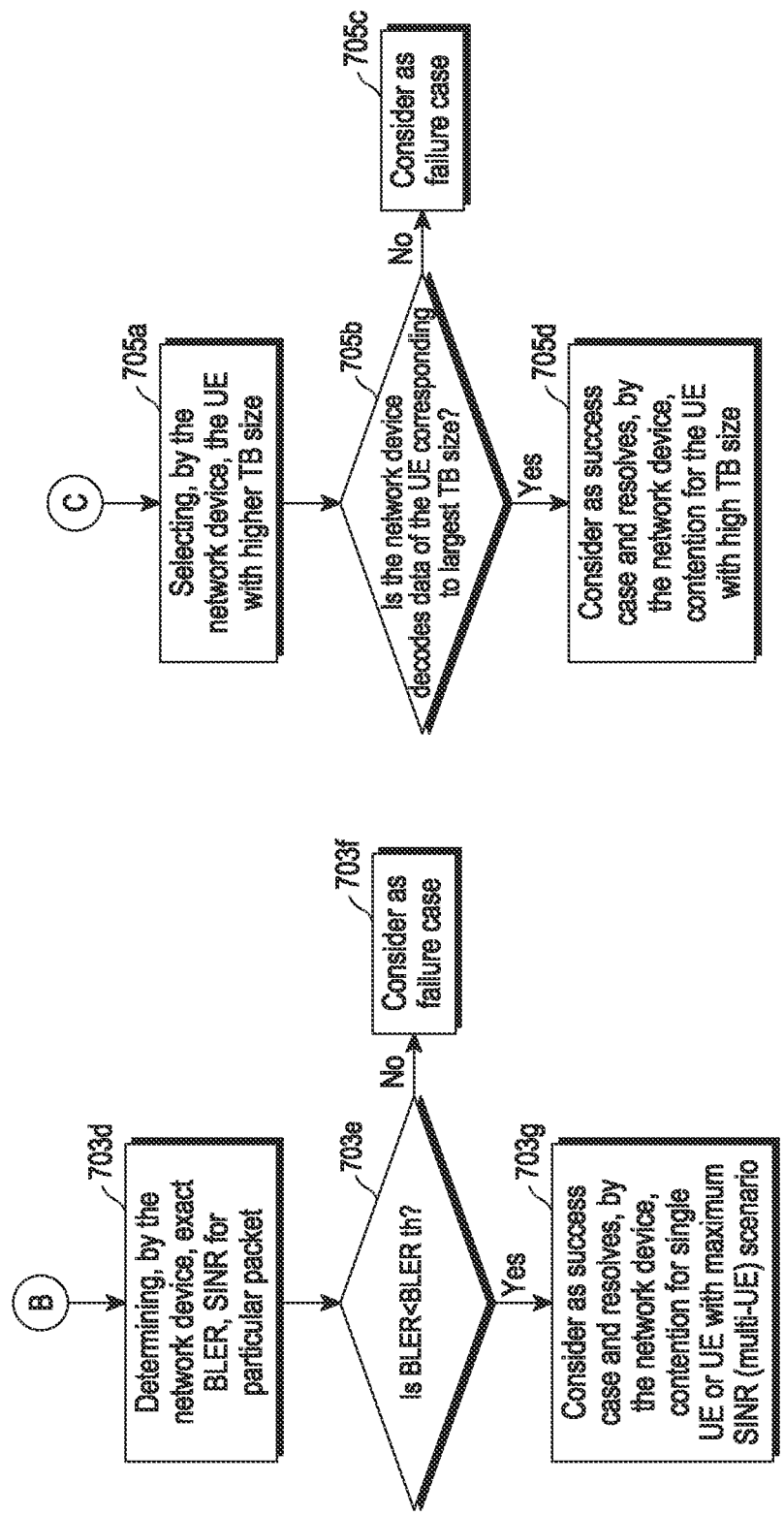

FIGS. 7A and 7B are a flowchart (700) illustrating an example method for minimizing/reducing contention on the shared PRB based on a network decision, according to various embodiments.

At operation 701, the method includes detecting that multiple UEs (100a-100n) use the same set of PRBs and sending data to the network device (200). At operations 702 to 703g or operations 702 to 704d or operations 702 to 705d, the method includes minimizing/reducing, by the network device, and the contention on the shared PRB based on the plurality of contention minimization parameters. The plurality of contention minimization parameters includes the high SINR and low BLER (operations 703 to 703g), the type of data application (operations 704 to 704d), and the size of the transport block (operations 705 to 705d).

High SINR and low BLER (operations 703 to 703g): at operation 703a, the UE (100) sends the uplink CSI measurements to the network device (200). At operation 703b, the network device (200) recognizes the SINR, BLER which acts as thresholds. At operation 703c, once the network device (200) receives a packet from the control resource block the network device (200) can make out the MCS index and the transport block size. At operation 703d, the network device (200) based on these factors determines the BLER for that particular packet. At operations, 703e to 703g, the network device (200) determines whether the BLER is less than the recognized BLER threshold (e.g., pre-defined threshold). If the BLER is less than the pre-defined threshold e.g., chance of NACK is less than the UE (100) can be considered as a priority. If multiple UEs (100a-100n) have BLER which is less than a pre-defined value then one with better SINR should be considered for a successfully received packet. The network device (200) accepts the CBDT data for the UE (100) that has the SINR above the predefined threshold or a Packet Error Rate (PER) lesser than a threshold PER while for the other UEs with lesser than the threshold SINR threshold (or PER>PER_threshold), send grants for BSR immediately.

Type of data application (operations 704 to 704d): at operation 704a, the network device (200) determines the data priority of the UE (100) (e.g., URLLC, IoT service). Few services are delay tolerant while other delay tolerance should be very less. Based on the type of data and priority of UE, the NW can decide for which UE contention needs to be resolved. At operation 704b, the network device (200) determines whether the data is decoded correctly within a tolerable decoding threshold or not. At operation 704c, the network device (200) determines a failure case in response to determining that the data is not decoded correctly within the tolerable decoding threshold. At operation 704d, the network device (200) determines a success case in response to determining that the data is decoded correctly within the tolerable decoding threshold. For example, if CBDT data is identified as URLLC data and meet the basic decoding tolerable threshold (to ensure reliability), the network device (200) must give priority over any other data.

Size of the transport block (operations 705 to 705d): at operation 705a, the network device (200) selects the UE (100) with a higher TB size. At operation 705b, the network device (200) determines whether the network device (200) decodes data of the UE (100) corresponding to the largest TB size. At operation 705c, the network device (200) determines a failure case in response to determining that the network device (200) does not decode the data of the UE (100) corresponding to the largest TB size. At operation 705d, the network device (200) determines a success case in response to determining that the network device (200) decodes the data of the UE (100) corresponding to the largest TB size. The UE (100) which is carrying the higher TB size should be considered a successful case as it will help to save network resources. If the network device (200) is able to decode the data properly one with a higher TB size should be accepted and the other should be considered a failure case.

In an embodiment, alternating between CBDT and regular mode in successive slots. In one slot if the UE (100) is successful to transmit its data to the satellite using CBDT, in the next data generation slot it will follow the regular conventional mode. With this approach the average probability of selecting the same CBDT resource by a large number of UEs in the network reduces.

Figure 8:
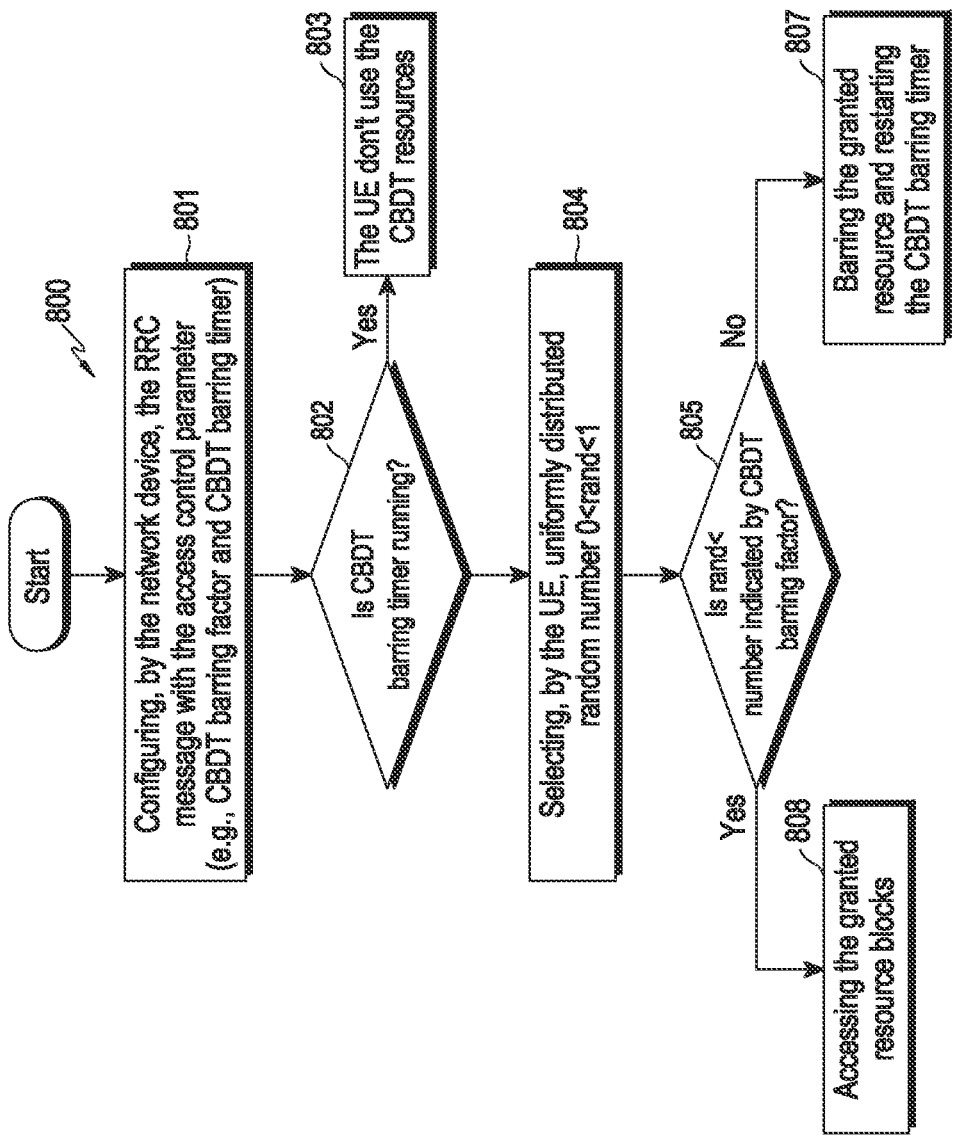
FIG. 8 is a flowchart illustrating an example method for minimizing the contention on the shared PRB based on an access control parameter, according to various embodiments.

FIG. 8 is a flowchart (800) illustrating an example method for minimizing/reducing the contention on the shared PRB based on the access control parameter, according to various embodiments.

At operation 801, the method includes configuring, by the network device (200), the RRC message with the access control parameter (e.g., CBDT barring factor and CBDT barring timer). At operation 802, the method includes determining, by the UE (100), whether the CBDT barring timer is running or not. At operation 803, the method includes not utilizing, by the UE (100), the CBDT resources (e.g., shared PRBs) in response to determining that the CBDT barring timer is running. At operation 804, the method includes selecting, by the UE (100), a uniformly distributed random number (e.g., 0<rand<1) in response to determining that the CBDT barring timer is not running. At operation 805, the method includes determining, by the UE (100), whether the uniformly distributed random number is lesser than the CBDT barring factor. At operation 806, the method includes accessing the grants for the CBDT resources (e.g., shared PRBs) for the uplink data transmission in response to determining that the uniformly distributed random number is lesser than the CBDT barring factor. At operation 807, the method includes barring the granted CBDT resources (e.g., shared PRBs) and restarting the CBDT barring timer in response to determining that the uniformly distributed random number is greater than the CBDT barring factor.

In an embodiment, the UE (100) self-schedules the shared PRBs based on the random selection and/or the coordination information to minimize contention on the shared PRB. When the UE (100) has the data for the uplink data transmission. Instead of selecting resources from start, the UE (100) should always select CBDT resources (e.g., shared PRBs) at random from a specific resource so that the probability of contention is reduced at the network device (200).

In an embodiment, the UE (100) self-schedules the shared PRBs based on a-priori information at the UE (100) on CBDT resource location at a PRB time-frequency grid (intra-PRB info). For a group of PRBs, the location of CBDT resource within the time-frequency grid is expected to be known at the UE or group of UEs. If a UE selects a particular CBDT resource by selecting the particular time-frequency grid location, it won't choose the same location for the next TTI.

In an embodiment, the UE (100) self-schedules the shared PRBs based on alternating between the CBDT and regular conventional mode in successive slots. In one slot if the UE (100) is successful to transmit its data to the network device (200) (e.g., satellite) using the CBDT, in the next data generation slot the UE (100) will follow the regular conventional mode. With this approach the average probability of selecting the same CBDT resource by the large number of UEs in the network reduces.

In an embodiment, the UE (100) self-schedules the shared PRBs based on coordinated signalling among UEs locally to schedule an optimal strategy of access to CBDT resources. Local UE cluster head that aggregates some prior information about the BSR of each UE (100) and their next possible access attempt. Based on the information at the UE cluster head from the network device (200), the UE cluster head groups the UE ad schedules their PRB scheduling for a few of the subsequent TTIs.

The various actions, acts, blocks, steps, or the like in the flow diagrams (400, 500 700, and 800) may be performed in the order presented, in a different order, or simultaneously. Further, in some embodiments, some of the actions, acts, blocks, steps, or the like may be omitted, added, modified, skipped, or the like without departing from the scope of the disclosure.

The embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for scheduling at least one shared physical resource block (PRB) by a user equipment (UE), in a wireless network, the method comprising:

receiving, by the UE, at least one PRB from a network device, wherein the at least one PRB is shared among multiple UEs in the wireless network;

detecting, by the UE, data for transmission;

in response to detecting the data, determining, by the UE, a modulation and coding scheme (MCS), a number of PRBs, and a size of a transport block required for transmission of the data;

scheduling, by the UE, use of the at least one PRB for transmission of the data by the UE based on at least one of the determined MCS, the number of PRBs, or the size of the transport block; and transmitting, by the UE, the data to the network device based on the self-scheduling by the UE.

2. The method of claim 1, wherein determining the MCS comprises:

determining a signal condition at the UE;

determining a size of the data for transmission; and determining the MCS based on the signal condition and the size of data.

3. The method of claim 2, wherein determining the signal condition at the UE comprises:

determining whether the wireless network utilizes a frequency division duplex (FDD) or time division duplex (TDD); and performing one of:

determining at least one of an uplink channel state information (CSI) and an uplink channel quality indicator (CQI) information in response to determining that the wireless network utilizes the FDD, wherein the at least one of the uplink CSI and the uplink CQI information receives from the network device based on a requirement of the UE, or determining at least one of a downlink CSI and a downlink CQI information in response to determining that the wireless network utilizes the TDD to determine the uplink CSI and the CQI;

determining the signal condition at the UE based on at least one of the uplink CSI and the uplink CQI information, and the downlink CSI and the downlink CQI information, wherein the uplink CSI and the downlink CSI comprise at least one of the CQI, a precoding matrix indicator (PMI), a rank indicator (RI), a level-1 reference signal received power (L1-RSRP) and a level-1 signal to interference and noise ratio (L1-SINR).

4. The method of claim 1, wherein determining the size of the transport block comprises:

determining a buffer status available at a medium access control (MAC) layer, a radio link control (RLC) layer, and a packet data convergence protocol (PDCP) layer; and determining the size of the transport block based on the available buffer status.

5. The method of claim 1, wherein determining the number of PRBs comprises:

determining the number of PRB based on one of the size of the transport block and a network indication in a radio resource control (RRC) message or downlink control information (DCI) message.

6. The method of claim 1, further comprising:

sending self-scheduling information to the network device, wherein the self-scheduling information indicates the PRB of the at least one shared PRB and the MCS used for the data transmission.

7. The method of claim 1, further comprising receiving access control parameter along with the at least one PRB from the network device,
   wherein the at least one PRB is self-scheduled further based on the access control parameter to reduce contention on the at least one shared PRB,
   wherein the access control parameter comprises a contention based data transmission (CBDT) barring factor and a CBDT barring timer,
   wherein the CBDT barring factor restricts access to the at least one PRB, and the CBDT barring timer blocks the UE from using the at least one PRB until the CBDT barring timer expires.

8. The method of claim 1, wherein the at least one PRB is self-scheduled further based on at least one of a random selection and a coordination information to reduce contention on the at least one PRB.

9. A method for scheduling at least one shared physical resource block (PRB) by a network device in a wireless network, the method comprising:
   determining, by the network device, a signal condition at the network device based on a plurality of measurement parameters;
   determining, by the network device, a modulation and coding scheme (MCS), and a number of PRBs required for data transmission of at least one user equipment (UE) based on a plurality of network parameters; and
   sending, by the network device, an indication of the determined MCS and the number of PRBs for the data transmission of the at least one UE to the at least one UE based on a requirement of the at least one UE and availability of the number of PRBs.

10. The method of claim 9, wherein the plurality of measurement parameters comprises at least one of an uplink channel state information (CSI), an uplink sounding reference signals (SRS), and an uplink channel quality indicator (CQI) information.

11. The method of claim 9, wherein the plurality of network parameters comprises at least one of a type of traffic, a ratio of an acknowledgement (ACK) and a negative acknowledgement (NACK), and a radio condition.

12. The method of claim 9, further comprising at least one of:
   pre-configuring a fixed MCS for data transmission for at least one of the at least one UE and a group of UEs; or
   pre-configuring a common MCS for data transmission for the at least one of the at least one UE and the group of UEs.

13. The method of claim 9, further comprising:
   determining that multiple user equipments (UEs) use a same PRB of the at least one shared PRB for sending data to the network device; and
   reducing contention on the at least one PRB based on a plurality of contention minimization parameters,
   wherein the plurality of contention minimization parameters comprises at least one of a high signal-to-interference-plus-noise ratio (SINR) and block error rate (BLER), a type of data application, or a size of a transport block.

14. A user equipment (UE) for scheduling at least one shared physical resource block (PRB) in a wireless network, the UE comprising:
   at least one processor including processing circuitry;
   a memory storing at least one command which, when executed individually and/or collectively by the at least one processor, controls the UE to:
      receive at least one PRB from a network device, wherein the at least one PRB is shared among multiple UEs in the wireless network;
      detect data for transmission;
      determine, in response to detecting the data, a modulation and coding scheme (MCS), a number of PRB, and a size of a transport block required for transmission of the data by the UE;
      self-schedule the at least one PRB for the UE to transmit the data based on at least one of the determined MCS, the number of PRB, or the size of the transport block; and
      transmit the data to the network device based on the self-scheduling.

15. The UE of claim 14, wherein for determining the MCS, the memory includes at least one command which, when executed individually and/or collectively by the at least one processor, controls the UE to:
   determine a signal condition at the UE;
   determine a size of the data for transmission; and
   determine the MCS based on the signal condition and the size of data.

16. The UE of claim 14, wherein for determining the size of the transport block, the memory includes at least one command which, when executed individually and/or collectively by the at least one processor, controls the UE to:
   determine a buffer status available at a medium access control (MAC) layer, a radio link control (RLC) layer, and a packet data convergence protocol (PDCP) layer; and
   determine the size of the transport block based on the available buffer status.

17. The UE of claim 14, wherein for determining the number of PRB, the memory includes at least one command which, when executed individually and/or collectively by the at least one processor, controls the UE to:
   determine the number of PRB based on one of the size of the transport block and a network indication in a radio resource control (RRC) message or downlink control information (DCI) message.

18. A network device for scheduling at least one shared Physical Resource Block (PRB) in a wireless network, the network device comprising:
   at least one processor comprising processing circuitry;
   a memory storing at least one command which, when executed individually and/or collectively by the at least one processor, controls the network device to:
      determine a signal condition at the network device based on a plurality of measurement parameters;
      determine a modulation and coding scheme (MCS), and a number of PRB is required for data transmission of at least one user equipment (UE) based on a plurality of network parameters; and
      send an indication of the determined MCS and the number of PRBs for the data transmission of the at least one UE to the at least one UE based on a requirement of the at least one UE and availability of the number of PRBs.

19. The network device of claim 18, wherein the plurality of measurement parameters comprises at least one of an uplink channel state information (CSI), an uplink sounding reference signals (SRS), and an uplink channel quality indicator (CQI) information.

20. The network device of claim 18, wherein the plurality of network parameters comprises at least one of a type of traffic, a ratio of an acknowledgement (ACK) and a negative acknowledgement (NACK), and a radio condition.

* * * * *